US010323451B2

(12) United States Patent
Ikeda et al.

(10) Patent No.: US 10,323,451 B2
(45) Date of Patent: Jun. 18, 2019

(54) VEHICLE WINDOW GLASS LIFTING DEVICE, AND VEHICLE

(71) Applicant: MITSUBA Corporation, Gunma (JP)

(72) Inventors: Hiroyuki Ikeda, Nagano (JP); Hideaki Takehara, Nagano (JP); Yasuhiro Saito, Nagano (JP); Sadaji Umehara, Nagano (JP); Tsuyoshi Kondo, Nagano (JP); Masakane Yoshizawa, Nagano (JP); Hideaki Kashiwagi, Nagano (JP); Mayu Kobayashi, Nagano (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 15/736,461

(22) PCT Filed: Jul. 10, 2015

(86) PCT No.: PCT/JP2015/069857
§ 371 (c)(1),
(2) Date: Dec. 14, 2017

(87) PCT Pub. No.: WO2016/208086
PCT Pub. Date: Dec. 29, 2016

(65) Prior Publication Data
US 2018/0187472 A1    Jul. 5, 2018

(30) Foreign Application Priority Data

Jun. 25, 2015 (JP) .................................. 2015-127855

(51) Int. Cl.
*E05F 15/02* (2006.01)
*E05F 15/73* (2015.01)
(Continued)

(52) U.S. Cl.
CPC ................. *E05F 15/73* (2015.01); *B60J 1/17* (2013.01); *B60R 25/01* (2013.01); *B60R 25/305* (2013.01);
(Continued)

(58) Field of Classification Search
CPC ......... E05F 15/73; E05F 15/40; E05F 15/689; E05F 2015/767; E05B 77/44; B60R 25/01; B60R 25/305; B60J 1/17; E05Y 2800/252
(Continued)

(56) References Cited

U.S. PATENT DOCUMENTS 5,955,854 A * 9/1999 Zhang ................... B60J 7/0573
318/264
6,925,755 B1 * 8/2005 Kyrtsos .................. G01S 13/04
49/26

(Continued)

FOREIGN PATENT DOCUMENTS

DE    4030607 A1 *  4/1992 ......... B60R 25/1004
JP    S57-21296       2/1982
(Continued)

OTHER PUBLICATIONS

International Preliminary Report on Patentability dated Jan. 4, 2018 from PCT/JP2015/069857.
(Continued)

*Primary Examiner* — Jerry E Redman
(74) *Attorney, Agent, or Firm* — Scully, Scott, Murphy & Presser, PC

(57) ABSTRACT

A vehicle window glass lifting device includes a drive mechanism arranged on a vehicle door to vertically move a window glass, a control unit for controlling the drive mechanism, and a camera for capturing an image of a detection line provided along at least a part of an outer edge of the window
(Continued)

glass in a state that the door and the window glass are closed. The control unit includes a detection means for detecting first and second blocked states in each of which the first and second detection lines are each blocked by the foreign object, and a crime prevention control means that determines that the foreign object intrudes from the vehicle exterior to a vehicle interior and conducts a crime prevention operation to a crime prevention when a condition that the second blocked state is detected by the detection means without detecting the first blocked state is satisfied.

18 Claims, 11 Drawing Sheets

(51) Int. Cl.
    *E05F 15/40*     (2015.01)
    *E05F 15/689*     (2015.01)
    *B60J 1/17*     (2006.01)
    *B60R 25/01*     (2013.01)
    *B60R 25/30*     (2013.01)
    *E05B 77/44*     (2014.01)
    *G06K 9/00*     (2006.01)

(52) U.S. Cl.
    CPC .............. *E05B 77/44* (2013.01); *E05F 15/40* (2015.01); *E05F 15/689* (2015.01); *G06K 9/00791* (2013.01); *E05F 2015/767* (2015.01); *E05Y 2400/44* (2013.01); *E05Y 2400/45* (2013.01); *E05Y 2400/52* (2013.01); *E05Y 2800/252* (2013.01); *E05Y 2900/55* (2013.01)

(58) Field of Classification Search
    USPC ...................................... 49/25, 26
    See application file for complete search history.

(56) References Cited

U.S. PATENT DOCUMENTS

| | | | | |
|---|---|---|---|---|
| 7,067,794 | B2* | 6/2006 | Le Gallo | E05F 15/431 |
| | | | | 250/221 |
| 7,362,068 | B2* | 4/2008 | Yamamoto | H02H 7/0851 |
| | | | | 318/266 |
| 8,854,465 | B1* | 10/2014 | McIntyre | B60R 25/1004 |
| | | | | 348/148 |
| 9,972,100 | B2* | 5/2018 | Lu | B60Q 1/1423 |
| 2005/0174079 | A1 | 8/2005 | Mersch | |
| 2005/0276449 | A1 | 12/2005 | Pedemas et al. | |
| 2007/0086624 | A1* | 4/2007 | Breed | G06K 9/00362 |
| | | | | 382/104 |
| 2008/0061720 | A1* | 3/2008 | Takahashi | H02H 3/006 |
| | | | | 318/286 |
| 2009/0046538 | A1* | 2/2009 | Breed | B60C 11/24 |
| | | | | 367/93 |
| 2011/0265381 | A1* | 11/2011 | Guarnizo | H02H 7/0851 |
| | | | | 49/26 |
| 2013/0125467 | A1* | 5/2013 | Ezzat | G01V 15/00 |
| | | | | 49/26 |
| 2014/0373446 | A1* | 12/2014 | Weidenbacher | E05F 15/695 |
| | | | | 49/31 |
| 2015/0247352 | A1* | 9/2015 | Adams | E05F 15/73 |
| | | | | 701/2 |
| 2015/0345205 | A1* | 12/2015 | Gunreben | E05F 15/77 |
| | | | | 701/2 |
| 2016/0300410 | A1* | 10/2016 | Jones | G06K 9/00288 |
| 2016/0348415 | A1* | 12/2016 | Baumgarte | E05F 15/40 |
| 2017/0362878 | A1* | 12/2017 | Gage | B60J 1/17 |
| 2018/0044964 | A1* | 2/2018 | Ikeda | B60J 1/00 |
| 2018/0058127 | A1* | 3/2018 | Ikeda | B60J 1/00 |
| 2018/0100342 | A1* | 4/2018 | Ikeda | B60J 1/00 |

FOREIGN PATENT DOCUMENTS

| | | |
|---|---|---|
| JP | H11-006361 A | 1/1999 |
| JP | H11-198648 A | 7/1999 |
| JP | 2007-186915 A | 7/2007 |
| JP | 2013-104174 A | 5/2013 |

OTHER PUBLICATIONS

International Search Report dated Sep. 8, 2015 issued in PCT/JP2015/069857.
Japanese Notification of Reasons for Refusal dated Oct. 20, 2015 issued in JP 2015-127855, with computer-generated English translation.
Extended European Search Report dated Feb. 4, 2019 from related EP 15896404.9.

* cited by examiner

VEHICLE WINDOW GLASS LIFTING DEVICE, AND VEHICLE

TECHNICAL FIELD

The present invention relates to a vehicle window glass lifting device and a vehicle.

BACKGROUND ART

In recent years, window glass lifting devices for vehicle for automatically raising or lowering window glasses are mounted on vehicles so that windows can be easily opened or closed.

Window glass lifting devices for vehicle are provided with a drive mechanism arranged at a vehicle door for moving a window glass vertically and a control unit for controlling the drive mechanism.

Since the window glasses are electrically raised or lowered, the window glass lifting devices for vehicle are generally provided with a mechanism to prevent pinching by window glass.

It is known that one of such mechanism is configured to monitor variation in rotational speed of a motor which drives a window glass, to determine that a foreign object is pinched by the window glass when a load increases and the rotational speed of the motor is reduced during raising the window glass, and to conduct various safety operations such as automatic lowering of window glass by reversing its movement direction.

In addition, as such mechanism, in PTL 1, conducting a safety operation before the object is pinched is proposed by the detection of the foreign object to be possibly pinched by the window glass based on the image captured by the camera.

CITATION LIST

Patent Literature

PTL 1: JP 2007/186915 A

SUMMARY OF INVENTION

Technical Problem

Crime act such as doing injury to passenger by intrusion of a hand etc. through an opened window into vehicle interior, or taking away goods in the vehicle interior takes place. It is possibly to unlock a door by intrusion of a hand etc. through the opened window into the vehicle interior or picking a vehicle key to prevent escaping. To prevent such action before happens, providing a crime prevention function against the intrusion from the vehicle exterior is desired.

Specifically, as comprising a pinching prevention mechanism described above, the safety operation may be conducted to prevent pinching by the window glass even when the intrusion from outside occurs. As a result, it is a problem to fail to achieve the crime prevention against the intrusion from the vehicle exterior by failing to close the window glass after attempted closing.

It is an object of the invention to provide a vehicle window glass lifting device that makes it possible to achieve the crime prevention against the intrusion from the vehicle exterior, and a vehicle.

Solution to Problem

The vehicle window glass lifting device according to one embodiment of the present invention comprises:

a drive mechanism arranged on a vehicle door to vertically move a window glass, a control unit for controlling the drive mechanism; and a camera for capturing an image of a detection line provided along at least a part of an outer edge of the window glass in a state that the door and the window glass are closed, wherein the detection line comprises at least a first detection line, and a second detection line provided on a vehicle exterior side of the first detection line, wherein the control unit comprises a detection means for detecting a first blocked state in which the first detection line captured as the image by the camera is at least partially blocked by a foreign object and a second blocked state in which the second detection line captured as the image by the camera is at least partially blocked by a foreign object, and a crime prevention control means that determines that a foreign object intrudes from the vehicle exterior to a vehicle interior and conducts a crime prevention operation to a crime prevention when a condition that the second blocked state is detected by the detection means without detecting the first blocked state is satisfied.

The above embodiment of the present invention comprises the configuration that "wherein the control unit comprises a detection means for detecting a first blocked state in which the first detection line captured as the image by the camera is at least partially blocked by a foreign object and a second blocked state in which the second detection line captured as the image by the camera is at least partially blocked by a foreign object, and a crime prevention control means that determines that a foreign object intrudes from the vehicle exterior to a vehicle interior and conducts a crime prevention operation to a crime prevention when a condition that the second blocked state is detected by the detection means without detecting the first blocked state is satisfied". In such configuration, the crime prevention operation can be conducted by detecting the intrusion from the vehicle exterior to the vehicle interior. The crime prevention against the intrusion from the vehicle exterior can be achieved.

A vehicle according to another embodiment of the invention comprises the vehicle window glass lifting device describe above.

Advantageous Effects of Invention

According to the one embodiment in the present invention, it is possible to provide a vehicle window glass lifting device that makes it possible to achieve the crime prevention against the intrusion from the vehicle exterior, and a vehicle.

DESCRIPTION OF EMBODIMENTS

Embodiments

Figure 1:
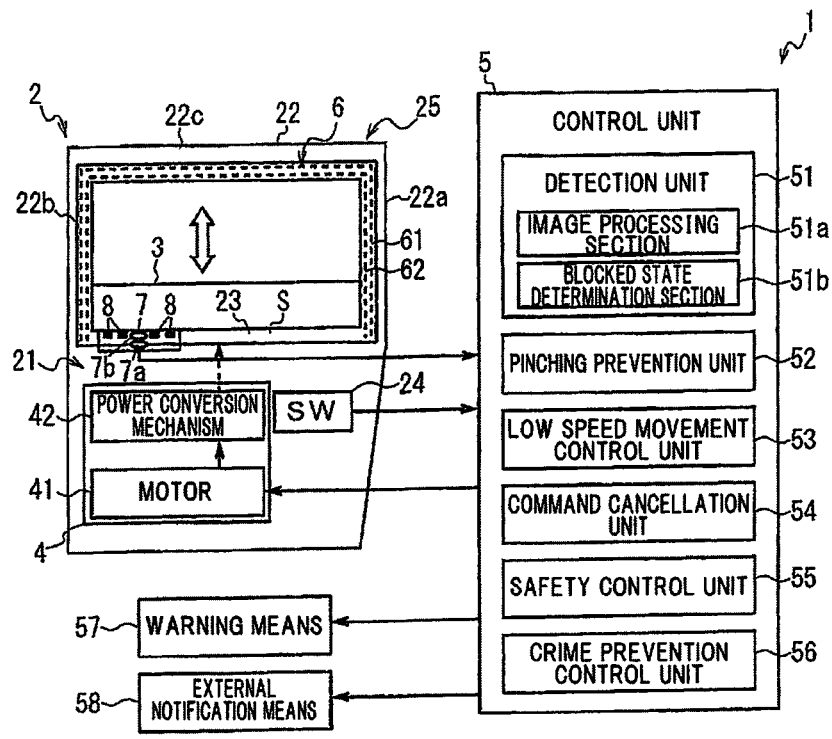
FIG. 1 is an explanatory diagram illustrating a vehicle window glass lifting device in an embodiment of the present invention.

An embodiment of the invention will be described below in reference to the drawings FIG. 1 is an explanatory diagram illustrating a vehicle window glass lifting device in the present embodiment.

As shown in FIG. 1, a door 2 of a vehicle (vehicle door) mounting a vehicle window glass lifting device 1 has a storage portion 21 for housing a window glass 3 and a frame portion 22 provided above the storage portion 21. A door trim 23 is attached on the vehicle interior side of the storage portion 21 so as to cover the storage portion 21.

The frame portion 22 is composed of a rear upright portion 22a extending upwards from an end of the storage portion 21 on the rear side in the front-back direction of the vehicle, a front upright portion 22b extending upwards from the storage portion 21 on the front side of the rear upright portion 22a, and an upper extended portion 22c extending from the top end of the rear upright portion 22a to the top end of the front upright portion 22b. When the window glass 3 is fully closed, the window glass 3 is positioned in a space surrounded by the frame portion 22 and the upper edge portion of the door trim 23. That is, a window frame 25 is composed of the frame portion 22 and the upper edge portion of the door trim 23. In the present embodiment, the window frame 25 means a portion contacting an outer edge of the window glass 3 in a state that the door 2 and the window glass 3 are closed.

The vehicle window glass lifting device 1 is provided with a drive mechanism 4 for driving the window glass 3 and a control unit 5 for controlling the drive mechanism 4.

The drive mechanism 4 is to move the window glass 3 vertically relative to the window frame 25, and is provided with a motor 41 such as DC motor and a power conversion mechanism 42 for converting a drive force of the motor 41 into power to vertically move the window glass 3. The power conversion mechanism 42 which can be used here is, e.g., a window regulator which is provided with a carrier plate supporting the window glass 3 and slidably moving along a guide rail and is configured to slidably move a wire along the guide rail by a drive force of the motor 41 and thereby to vertically move the carrier plate attached to the wire and the window glass 3 along the guide rail. An X-Arm type or another type of regulator can be also used as the power conversion mechanism 42.

A switch (SW) 24 is provided on the door 2 to lift the window glass 3. An output signal line of the switch 24 is connected to the control unit 5. The switch 24 is constructed from, e.g., a two-stage click-type rocker switch which is configured to output a signal to the control unit 5, such that a first-level move-down click signal is output when an end on the move-down side is clicked to the first level, a second-level move-down click signal is fduoutput when the end on the move-down side is clicked to the second level, a first-level move-up click signal is output when the other end on the move-up side is clicked to the first level, and a second-level move-up click signal is output when the other end on the move-up side is clicked to the second level.

The control unit 5 controls the drive mechanism 4 according to the signal from the switch 24 to vertically move the window glass 3. The control unit 5, as a control unit constructed by appropriately combining CPU, memory, interface and software, etc., is mounted on the door 2. Other than on the door 2, the control unit 5 may alternatively be mounted as a part of, e.g., an electronic control unit (ECU) which controls mirrors or seats of the vehicle.

The control unit 5 is configured to control the drive mechanism 4 such that when a first-level move-down click signal is input from the switch 24, the window glass 3 is lowered while the signal is being input, and when a second-level move-down click signal is input, the window glass 3 continues to move down until the window glass 3 reaches the bottom or the switch 24 is operated again. Also, the control unit 5 controls the drive mechanism 4 such that when a first-level move-up click signal is input from the switch 24, the window glass 3 is raised while the signal is being input, and when a second-level move-up click signal is input, the window glass 3 continues to move up until the window glass 3 reaches the top or the switch 24 is operated again.

The vehicle window glass lifting device 1 is provided with both functions to prevent the intrusion from vehicle exterior and to prevent pinching by the window glass 3. Next, a configuration to prevent the intrusion from vehicle exterior and to prevent pinching by the window glass 3 will be described.

The vehicle window glass lifting device 1 is provided with a camera 7 which captures an image of a detection line 6. The detection line 6 is provided on the vehicle interior side of the window glass 3 and is at least partially along the outer edge of the window glass 3 in a state that the door 2 and the window glass 3 are closed. In the present embodiment, whether or not the intrusion of the foreign object from the vehicle exterior to the vehicle interior is present and a foreign object to be possibly pinched by the window glass 3 is present are judged based on an image captured by the camera 7. A specific configuration and installed position of the camera 7 will be described later.

The detection line 6 is a reference line for judging whether or not the intrusion of the foreign object from the vehicle exterior to the vehicle interior is present and a foreign object to be possibly pinched by the window glass 3 is present. A specific configuration and setting position of the detection line 6 will be described later.

In the present embodiment, light sources 8 emitting infrared radiation toward the detection line 6 are also provided. The camera 7 is constructed from an infrared camera which captures the infrared radiation emitted from the light sources 8 and reflected by the detection line 6. Since the light sources 8 are provided, the intrusion of the foreign object can be detected also during the night, or in a dark place even in a daytime where infrared radiation does not reach, e.g., in an underground parking, etc. A light source which emits near infrared radiation can be used as the light source 8.

The control unit 5 has a detection unit 51 and a pinching prevention unit 52. The detection unit 51, which is one aspect of the detection means of the invention, detects a blocked state in which the detection line 6 captured by the camera 7 is at least partially blocked by a foreign object. The pinching prevention unit 52, which is one aspect of the pinching prevention means of the invention, causes the drive mechanism 4 to conduct a pinch prevention operation for preventing pinching by the window glass 3 when the blocked state is detected by the detection unit 51 while the window glass 3 is moved by the drive mechanism 4. Specific control contents of the detection unit 51 and the pinching prevention unit 52 will be described later.

In addition, the control unit 5 is provided with a safety control unit 55 that detects causing pinching by the window glass 3, and causes the drive mechanism 4 to conduct a safety operation to reverse a movement direction of the window glass 3 and lower the window glass 3 automatically when pinching occurs. Although a detection means to detect pinching by the window glass 3 is not limited thereto, e.g., the safety control unit 55 may be configured to arrange a sensor to detect a number of rotations of the motor 41, monitor the number of rotations of the motor 41 based on an output from the sensor, judge as causing pinching of the foreign object by the window glass 3 when the load increases during the window glass 3 is lifted and the number of rotations of the motor 41 is reduced, and conduct the safety operation to reverse the movement direction of the window glass 3 and lower the window glass 3 automatically.

The control unit 5 is further provided with a crime prevention control unit 56 to judge whether or not the foreign object intrudes from the vehicle exterior to the vehicle interior based on a detection result of the blocked state by the detection unit 51, and conduct the crime prevention operation for crime prevention. The crime prevention control unit 56 is an embodiment of the crime prevention control means in the present invention. Specific control contents of the crime prevention control unit 56 will be described later.

Next, specific configurations, etc., of the camera 7 and the detection line 6 will be described.

Figure 2:
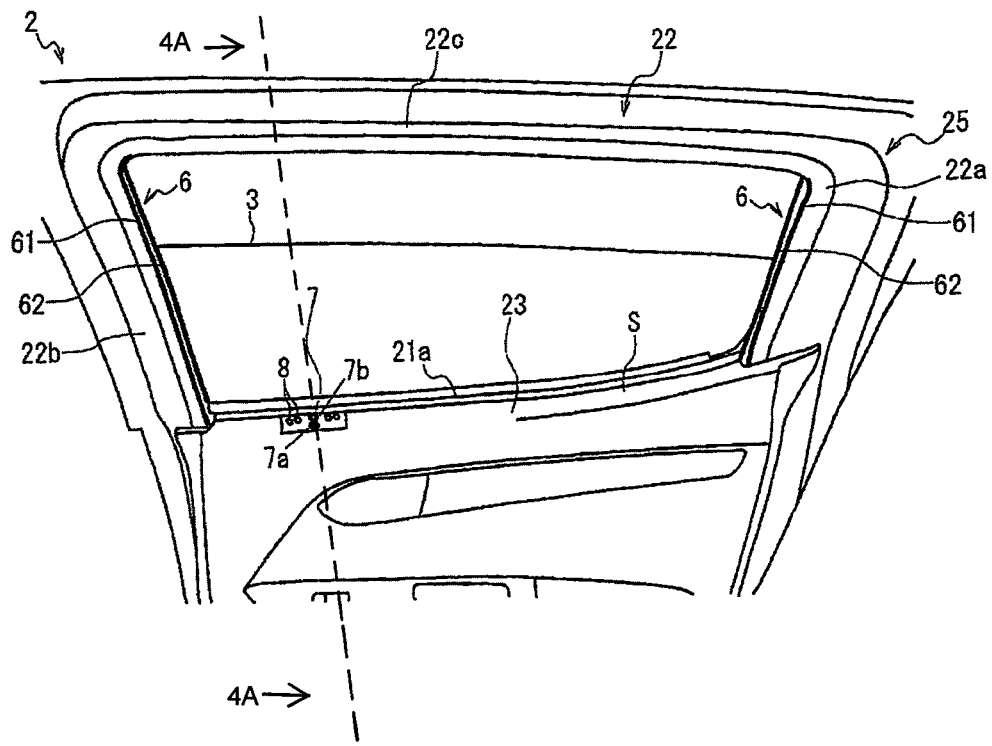
FIG. 2 is an explanatory diagram illustrating a door when viewed from the upper side inside a vehicle.
Figure 3:
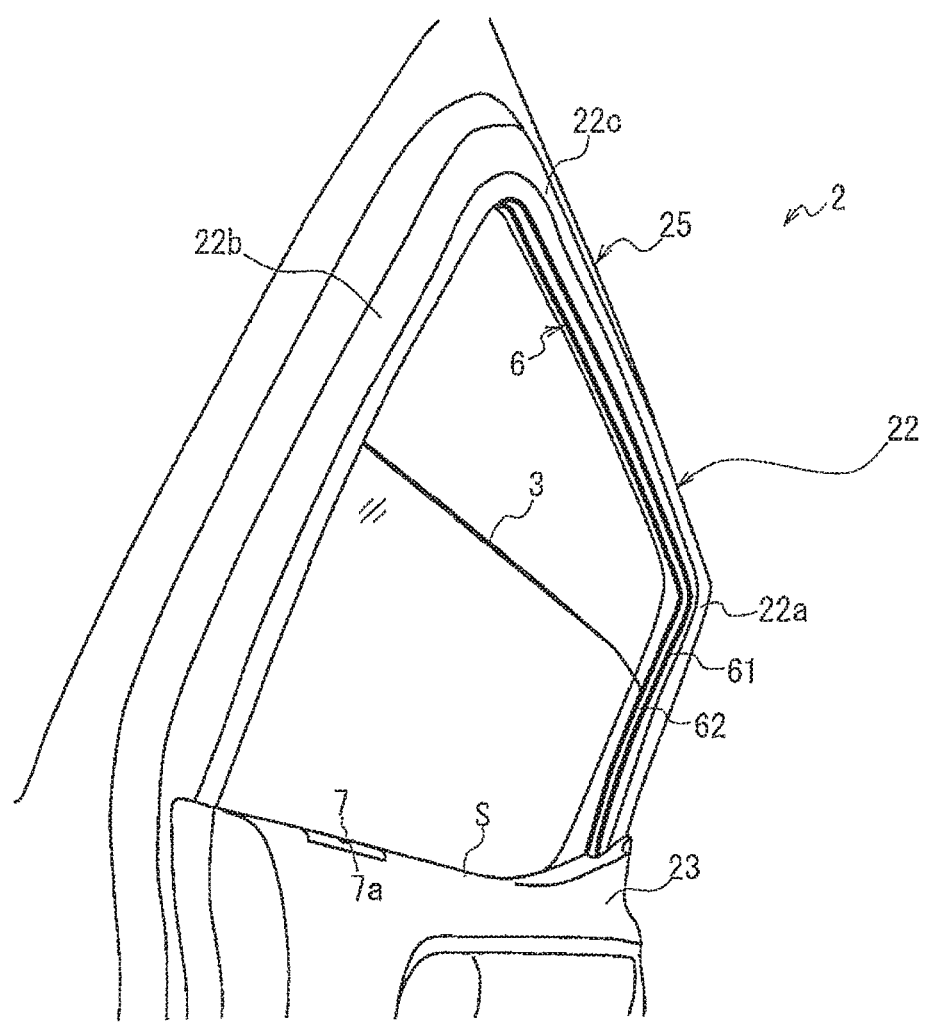
FIG. 3 is an explanatory diagram illustrating the door when viewed from the lower-front side of the vehicle.
Figure 4A:
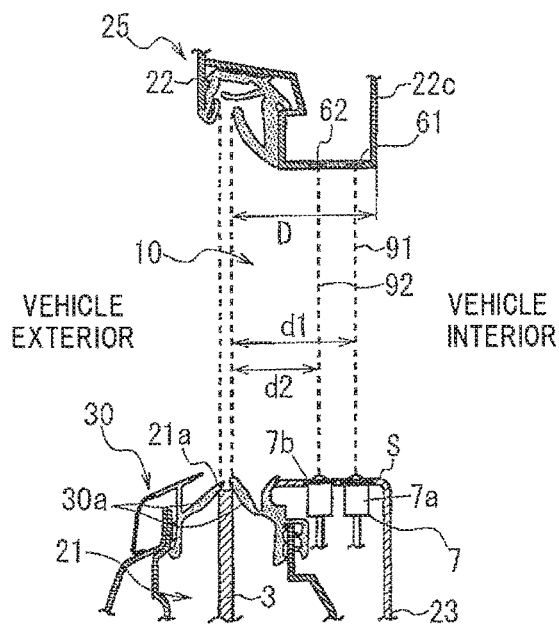
FIG. 4A is a cross sectional view illustrating a cross section taken along lines 4A-4A of FIG. 2 in a vertical direction of the door at the position including a camera.

FIG. 2 is an explanatory diagram illustrating the door 2 when viewed from the upper side inside a vehicle, FIG. 3 is an explanatory diagram illustrating the door 2 when viewed from the lower-front side of the vehicle, FIG. 4A is a cross sectional view illustrating a cross section in a vertical direction of a door at the position including the camera 7.

Figure 4B:
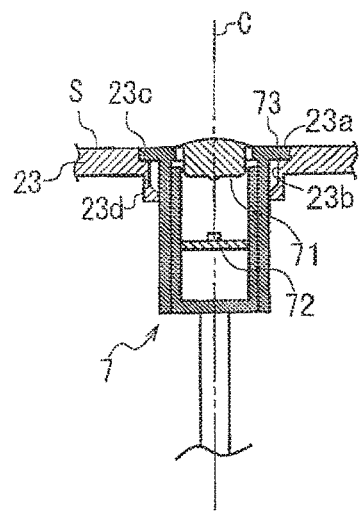
FIG. 4B is an enlarged view of FIG. 4A showing the position provided with the camera.

FIG. 4B is an enlarged view of FIG. 4A showing the position provided with the camera.

As shown in FIGS. 2 to 4B, in the vehicle window glass lifting device 1 of the present embodiment, the camera 7 has an optical system 71 including at least one lens and an image pickup device 72 onto which a subject image is focused by the optical system 71, and the optical system 71 is arranged at a position corresponding to an opening 23a formed on an upper surface S of the door trim 23 so that an optical axis C of the optical system 71 passes through the opening 23a.

In other words, in the present embodiment, the camera 7 is provided on the upper surface S of the door trim 23. The upper surface S of the door trim 23 here is an outer surface of the door trim 23 at a top edge portion and is a surface which is visible from above in a vertical direction. The upper surface S of the door trim 23 may be inclined with respect to the vehicle width direction (horizontal direction). The door trim 23 is generally curved such that the upper surface S has the highest portion near the window glass 3, i.e., near an exit slot 21a allowing the window glass 3 to come out from the storage portion 21, and slopes down as a distance from the window glass 3 increases. Thus, the upper surface S of the door trim 23 is an outer surface of the door trim 23 (a portion corresponding to an inner circumferential surface on a lower side of the window frame 25) near the window glass 3 (the exit slot 21a).

The opening 23a is formed on the vehicle interior side of the exit slot 21a, and the optical system 71 of the camera 7 is arranged so that the optical axis C is located on the vehicle interior side of the exit slot 21a. Although the camera 7 in this example is arranged so that the optical axis C of the optical system 71 coincides with the vertical direction when viewed in the cross section in FIG. 4A, the optical axis C of the optical system 71 may be inclined with respect to the vertical direction in the front-back direction of the vehicle or in the vehicle width direction, and can be appropriately adjusted according to the installed position or desired imaging range of the camera 7.

In the present embodiment, the camera 7 is arranged in a hole 23b provided on the upper surface S of the door trim 23 at a front side position of the vehicle (at the front side position of the upper surface S of the door trim 23 on a side facing the window glass 3). Although the camera 7 provided on the upper surface S of the door trim 23 here has been described as an example, the position to provide the camera 7 is not limited thereto. The camera 7 may be provided on e.g. the inner circumferential surface of the frame portion 22 or an interior ceiling of the vehicle. The inner circumferential surface of the frame portion 22 here is a surface of the frame portion 22 facing the window glass 3 and is composed of a surface of the rear upright portion 22a on the front side of the vehicle, a surface of the front upright portion 22b on the rear side of the vehicle and a surface of the upper extended portion 22c on the lower side. In other words, the inner circumferential surface of the frame portion 22 is an outer surface of the frame portion 22 near the window glass 3. The installed position of the camera 7 will be described later.

The camera 7 has a columnar shape as a whole and has a flange 73 which is formed at a top end so as to protrude radially outward. The camera 7 is inserted into the hole 23b from above the door trim 23 and is fixed to the door trim 23 by arranging the flange 73 so as to be housed in a recess 23c formed at a circumferential edge of the hole 23b and engaging a locking pawl 23d, which is provided at a lower circumferential edge of the hole 23b, with a groove (not shown) provided on the camera 7. Although the top end face of the camera 7 is flush with the upper surface S of the door trim 23 in this example, the top end face of the camera 7 may protrude upward from the upper surface S of the door trim 23 or may be located below the upper surface S of the door trim 23. In addition, although the camera 7 in this example is arranged so that a portion of the optical system 71 is located above the opening 23a, the camera 7 may be arranged so that the optical system 71 is located below the opening 23a. In addition, the structure for fixing the camera 7 to the door trim 23 and the direction to insert the camera 7 are not specifically limited and can be appropriately changed.

The camera 7 is desirably configured so that the imaging range (a viewing angle) thereof covers the entire moving area of the window glass 3. In detail, in case that the window glass 3 is configured to be completely retracted, the viewing angle of the camera 7 desirably covers the range from the vertically upper portion to the lower end of the rear upright portion 22a on the rear side of the vehicle and from the vertically upper portion to the lower end of the front upright portion 22b on the front end of the vehicle. Meanwhile, in case that the window glass 3 is configured to not be completely retracted, the viewing angle of the camera 7 desirably covers the range from the vertically upper portion to an intersection formed between the rear upright portion 22a and the upper edge (upper rim) of the window glass 3 which is located at the lowest position, and the range on the front side of the vehicle from the vertically upper portion to an intersection formed between the front upright portion 22b and the upper edge (upper rim) of the window glass 3 which is located at the lowest position.

It is desirable to use a wide-angle lens as the optical system 71 of the camera 7 so that a foreign object can be detected in the range described above. The optical system 71 used in this example is formed by combining plural ultra wide-angle lenses so as to have a viewing range of not less than 180°, or 190° taking into account the installation precision, in the front-back direction of the vehicle.

Meanwhile, to quickly detect the foreign object, the frame rate of the image pickup device 72 used is desirably as high as possible. In the present embodiment, a CMOS (Complementary MOS) image sensor is used as the image pickup device 72.

In the vehicle window glass lifting device 1 according to the present embodiment, the detection line 6 is provided with at least a first detection line 61 and a second detection line 62 provided on the vehicle exterior side of the first detection line 61. The camera 7 is provided with at least a first camera 7a capturing the first detection line 61 and a second camera 7b capturing the second detection line 62. The first detection line 61 and the second detection line 62 are provided along at least a part of the outer edge of the window glass 3 in a state that the door 2 and the window glass 3 are closed.

In the present embodiment, although both cameras 7a, 7b are installed in the same position in the vehicle front-back direction so as to be parallel in the vehicle width direction, installed positions of the cameras 7a, 7b may not be in the same positions. For example, the cameras 7a, 7b may be installed in positions where are shifted in the vehicle front-back direction.

In the present embodiment, both detection lines 61, 62 are respectively provided on the vehicle interior side of the window glass 3. However, it is not limited thereto. The second detection line 62 may be provided on the vehicle exterior side of the window glass 3. Meanwhile, the first detection line 61 needs to be provided on at least the vehicle interior side of the window glass 3 to detect the foreign object approaching the window glass 3 from the vehicle interior side. Furthermore, the description will be described later, in the present embodiment, although the operation is conducted that the movement speed of the window glass 3 is reduced when the first detection line 61 is blocked by the foreign object (when the first blocked state is detected), and to prevent pinching by the window glass 3 when the second detection line 62 is blocked by the foreign object (when the second blocked state is detected), both detection lines 61, 62 needs to be provided on the vehicle interior side from the window glass 3 so as to conduct such operation.

In the present embodiment, both detection lines 61, 62 are provided along the entire frame portion 22 on the vehicle interior side at a distance from the window glass 3. As such, in the present embodiment, double detection lines 61, 62 are provided in the vehicle width direction.

The detection lines 61, 62 may be provided on either the door 2 or the vehicle body as long as it is provided along the window frame 25. For example, in a vehicle in which a distance D between the window glass 3 and an edge (an end face) of the frame portion 22 on the vehicle interior side (see FIG. 4A) is small, the second detection line 62 may be provided on the door 2 side and the first detection line 61 may be provided on the vehicle body side. The detection lines 61, 62 may not be respectively continuous, and can be respectively provided partially on the door 2 and partially on the vehicle body.

In the present embodiment, the both detection lines 61, 62 provided on the door 2 is described as an example. In this case, the both detection lines 61, 62 are provided on the inner circumferential surface of the entire frame portion 22, i.e., the inner surfaces of all the rear upright portion 22a, the front upright portion 22b and the upper extended portion 22c, on the vehicle interior side at a distance from the window glass 3.

The light source 8 is configured such that the entire both detection lines 61, 62 are exposed to radiation. Although four light sources 8 are used in this example to emit infrared radiation onto the both detection lines 61, 62 provided on the entire inner surface of the frame portion 22, the number of the light sources 8 is not limited thereto. In addition, although the light sources 8 in this example are arranged on the upper surface S of the door trim 23 near the camera 7, the positions of the light sources 8 are not limited thereto. For example, the light sources 8 may be arranged on the inner circumferential surface of the frame portion 22.

The both detection lines 61, 62 are formed so that brightness under infrared radiation is different from surrounding members. For example, when a metal (sheet metal) constituting the door 2 and a rubber member (waist) on the vehicle body are adjacent to each other in the state that the door 2 is closed, a boundary therebetween (i.e., a boundary between the door 2 and the vehicle body) can be used as the both detection lines 61, 62. Meanwhile, when the inner circumferential surface of the frame portion 22 is formed of a resin, a line formed by providing a recess on a portion of the resin so as to have a different infrared reflectance from the surroundings can be used as the both detection lines 61, 62. However, it is not limited thereto. The both detection lines 61, 62 may be formed by applying a highly infrared reflective paint to the inner surface of the frame portion 22, or may be an existing member of which brightness under infrared radiation is different from surroundings. The same applies to when the both detection lines 61, 62 are provided on the vehicle body.

In the present embodiment, the pinch prevention operation is also conducted when the blocked state (the second blocked state described below) is detected while the window glass 3 is moving down. This is to prevent a part of human body such as finger from being dragged into the exit slot 21*a* while the window glass 3 is moving down. A weather strip 30 having a lip seal 30*a* slidably in contact with the window glass 3 is provided around the exit slot 21*a* to prevent ingress of water, etc., into the storage portion 21 (an internal space of the door 2). When the window glass 3 is lowered, clothing or a part of human body such as finger may be dragged, together with the lip seal 30*a*, into the storage portion 21. In the present embodiment, it is possible to prevent such dragging and thereby to further improve safety. Here, an operation of moving down the window glass 3 is not included in the pinch prevention operation which is conducted when the blocked state is detected while the window glass 3 is moving down.

Figure 5:
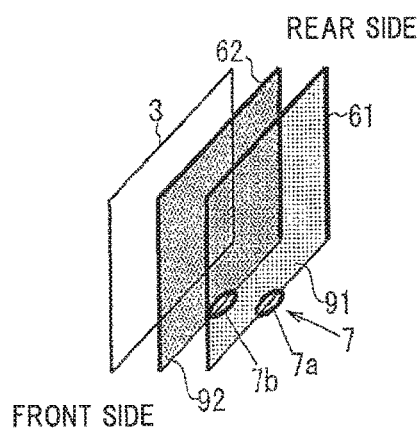
FIG. 5 is a schematic explanatory diagram illustrating an example of a detection surface.

A first detection surface 91 described hereinafter is a plane formed by connecting points between the optical system 71 of the first camera 7*a* and the first detection line 61 at which the foreign object when located thereon causes the blocked state. In addition to, a second detection surface 92 described hereinafter is a plane formed by connecting points between the optical system 71 of the second camera 7*b* and the second detection line 62 at which the foreign object when located thereon causes the blocked state. The first detection surface 91 and the second detection surface 92 formed in the present embodiment are shown in FIG. 5. As shown in FIG. 5, in the present embodiment, double detection surfaces 91, 92 are formed in the vehicle width direction.

The detection surfaces 91, 92 are substantially the same as a plane connecting the center of the optical system 71 of the cameras 7*a*, 7*b* (the center in the vehicle width direction, the height direction and the front-back direction of the vehicle) to the detection lines 61, 62 respectively, although depending on the specific configuration of the optical system 71. The detection surfaces 91, 92 do not need to be an entirely continuous plane. For example, when the detection lines 61, 62 are not continuous, the detection surfaces 91, 92 are composed of plural planes. Meanwhile, in case that the detection lines 61, 62 are composed of dots, lines are formed when connecting points between the optical system 71 of the cameras 7*a*, 7*b* and the detection lines 61, 62 at which a foreign object when located thereon causes the blocked state, and such lines are also included as the detection surfaces 91, 92. When the detection surfaces 91, 92 are composed of plural planes or lines, a distance between adjacent planes or lines is desirably not more than at least a thickness of young child's finger (e.g., 4 mm) to ensure safety.

A first detection surface 91 that is approximately parallel to the inner surface of the window glass 3 is provided by setting a distance in the vehicle width direction from the window glass 3 to the first detection line 61 constantly and setting a distance in the vehicle width direction from the window glass 3 to the first camera 7*a* (the center of the optical system 71) equal to the distance in the first detection line 61 in the vehicle width direction from the window glass 3. Furthermore, a second detection surface 92 that is approximately parallel to the inner surface of the window glass 3 is provided by setting a distance in the vehicle width direction from the window glass 3 to the second detection line 62 constantly and setting a distance in the vehicle width direction from the window glass 3 to the second camera 7*b* (the center of the optical system 71) equal to the distance in the second detection line 62 in the vehicle width direction from the window glass 3. Therefore, the two detection surfaces 91, 92 approximately parallel to the window glass 3 are provided.

Next, control contents of the prevention pinching by the window glass 3 in the control unit 5 will be described.

In the present embodiment, the detection unit 51 is configured to detect at least a first blocked state in which the first detection line 61 is at least partially blocked by a foreign object, and a second blocked state in which the second detection line 62 is at least partially blocked by a foreign object. In such configuration, since the two cameras 7*a*, 7*b* are used, the detection unit 51 is configured to detect the first blocked state based on an image captured by the first camera 7*a*, and detect the second blocked state based on an image captured by the second camera 7*b*.

In more detail, the detection unit 51 is provided with an image processing section 51*a* which processes the image captured by the first camera 7*a* and extracts the first detection line 61, and processes the image captured by the second camera 7*b* and extracts the second detection line 62, and a blocked state determination section 51*b* which determines, based on the image processed by the image processing section 51*a*, whether or not it is the first blocked state in which the first detection line 61 is at least partially blocked by a foreign object and whether or not it is the second blocked state in which the second detection line 62 is at least partially blocked by a foreign object.

A specific method of extracting the detection lines 61, 62 by the image processing section 51*a* is not specifically limited. For example, when an unnecessary portion is removed by trimming the image captured by the cameras 7*a*, 7*b* and posterization process, binarization process or edge detection process is conducted, the detection lines 61, 62 with brightness different from surrounding members can be extracted.

The blocked state determination section 51*b* is configured such that, for example, images in a non-first blocked state and a non-second blocked state (which are images after being processed by the image processing section 51*a*) are preliminarily stored as initial state images, and whether or not the both detection lines 61, 62 are blocked by an foreign object is determined by comparing the initial state images to images output from the image processing section 51*a*. The blocked state determination section 51*b* is configured to, e.g., compare the initial state image to images output from the image processing section 51*a* and to determine it is the first blocked state and the second blocked state when differences of the edges of the extracted detection lines 61, 62 or differences of the areas of the detection lines 61, 62 exceed a preset foreign object determination threshold.

In addition, in the present embodiment, the pinching prevention unit 52 is configured such that the drive mechanism 4 conducts a control to reduce operational speed (moving speed) of the window glass 3 when the first blocked state is detected while the window glass 3 (in more detail, when the first blocked state is detected without detecting the second blocked state) is moved and conducts the pinch prevention operation when the second blocked state is detected.

In such configuration, the operational speed of the window glass 3 can be reduced preliminary until the second blocked state is detected. The window glass 3 can be halted or reversed before the intruding foreign object comes into contact with the window glass 3 even when the second detection line 62 (the second detection surface 92) is provided closer to the window glass 3.

In other words, according to the present embodiment, the second detection line 92 (the second detection surface 92) can be provided closer to the window glass 3 while sufficient safety is ensured. As a result, the window glass 3 can be moved even when the passenger reclines to the door 2 (Meanwhile, the moving speed of the window glass 3 is reduced when the first blocked state is detected).

The both detection lines 61, 62 here are provided on the inner circumferential surface of the entire frame portion 22. Thus, the first blocked state is surely detected when the second blocked state is detected.

The pinch prevention operation that the drive mechanism 4 conducts when the pinching prevention unit 52 detects the second blocked state includes an operation of stopping movement of the window glass 3, an operation of lowering the window glass 3 to a safe position, an operation of warning an operator by sound or light from an alarm device installed inside the vehicle, and a combination thereof.

In the meantime, in view of more improving the convenience, it is desirable to provide the first detection surface 91 close to the window glass 3 preferably not only the second detection surface 92. To provide the first detection surface 91 close to the window glass 3, the time between when the first blocked state is detected and when the operational speed of the window glass 3 is reduced needs to be as short as possible, i.e., the operational speed of the window glass 3 needs to be reduced immediately.

In the present embodiment, the pinching prevention unit 52 is configured such that the operational speed of the window glass 3 is reduced by outputting instructions to halt the movement of the window glass 3 or lower the window glass 3 (an instruction to halt the window glass 3 while the window glass 3 is lowered) to the drive mechanism 4 when the first blocked state is detected while the window glass 3 is moved.

The pinching prevention unit 52 is configured to instruct the drive mechanism 4 to keep the instruction and halt the movement of the window glass 3 or lower the window glass 3 when the second blocked state is detected within the predetermined time after the first blocked state is detected, and to move the window glass 3 at low speed (it is referred to as low speed) that is lower than the operational speed in normal times (it is referred to as normal speed) when the second blocked state is not detected within the predetermined time after the first blocked state is detected.

"The predetermined time" here is set at time less than time that elapses from when the instruction such that the window glass 3 is halted or lowered to the drive mechanism 4 is output to when the window glass 3 is actually halted or lowered, more desirably, is set at time not less than time that elapse from when the instruction is output to the drive mechanism 4 such that the window glass 3 is halted or lowered to when the operational speed of the window glass 3 becomes predetermined low speed.

In other words, in the present embodiment, although the instructions to halt or lower the window glass 3 is output at timing when the first blocked state is detected, the window glass 3 is not halted or lowered at this timing. The window glass 3 is halted or lowered only when the second blocked state is detected.

This is because although the operational speed of the window glass 3 can be reduced by changing pulse width (duty ratio) output to the motor 41 since the motor 41 in the drive mechanism 4 is normally controlled by Pulse Width Modulation (PWM) control etc., the operational speed of the window glass 3 can be reduced more quickly by outputting the instruction to halt the window glass 3 and stopping power supply to the motor 41 than by changing the duty ratio. When the instruction to lower the window glass 3 is output, the operational speed of the window glass 3 can be reduced further quickly since the reverse voltage is applied to reverse the motor 41.

In the present embodiment, although the drive mechanism 4 is configured to output the instruction to halt the movement of the window glass 3 or lower the window glass 3 to the drive mechanism 4 (the instruction to halt the window glass 3 while the window glass 3 is lowered) such that an exist control content in the drive mechanism 4 is used without changing control content in the drive mechanism 4, the drive mechanism 4 can be configured to conduct a special control if the control content of the drive mechanism 4 can be changed. For example, the drive mechanism 4 may be configured such that the operational speed of the window glass 3 is reduced quickly by stopping power supply to the motor 41 or applying the reverse voltage to the motor 41.

In the present embodiment, although the operational speed of the window glass 3 is reduced by outputting the instruction to halt the movement of the window glass 3 or lower the window glass 3 (the instruction to halt the window glass 3 while the window glass 3 is lowered) to the drive mechanism 4 when the first blocked state is detected while the window glass 3 is moved, in this case, e.g., the motor 41 repeats switch on and off when the first blocked state repeats detected and non-detected by the rock of the passenger etc. Thus, the window glass 3 may instruct unnatural behavior depending on the structure of the drive mechanism 4. Therefore, the pinching prevention unit 52 is preferably configured to output the instruction such that the operational speed of the window glass 3 becomes the low speed to the drive mechanism 4 when the first blocked state is detected while the window glass 3 is moved in case that the unnatural behavior is remarkable. Furthermore, the unnatural behavior in the window glass 3 may be prevented by keeping the operational speed of the window glass 3 to the low speed until the predetermined time elapses from when the first blocked state is not detected in case that the first blocked state is not detected after the first blocked state is detected.

In the present embodiment, positions of the cameras 7a, 7b and the detection lines 61, 62 are determined such that the pinch prevention operation can be conducted (i.e., halting or reversing the window glass 3) before contact of the intruding foreign object with the window glass 3 in the entire moving area of the window glass 3.

The minimum distance (a distance from the inner surface of the window glass 3 in the vehicle width direction) at which the pinch prevention operation can be conducted before contact of the intruding foreign object with the window glass 3 is calculated by taking into account the anticipated intrusion speed of the foreign object, the frame rate of the camera 7, the operating speed of the control unit 5 (time that elapses from when the image is captured to when it is judged that the foreign object enters) and the speed that the drive mechanism 4 stops the movement of the window glass 3 (the time that elapses before the window glass 3 stops). This minimum distance is referred to as a safety ensuring distance.

A distance d1 in the vehicle width direction between the first detection surface 91 and an inner surface of the window glass 3 is not less than the safety ensuring distance in the entire first detection surface 91 when the operational speed of the window glass 3 is the normal speed. Thus, the first detection line 61 is provided on a position where a distance in the vehicle width direction from the inner surface of the window glass 3 is not less than the safety ensuring distance when the operational speed of the window glass 3 is the normal speed. Also, the first camera 7a is arranged at a position where a distance in the vehicle width direction from the inner surface of the window glass 3 to the center of the optical system 71 is not less than the safety ensuring distance when the operational speed of the window glass 3 is in the normal speed.

The second detection surface 92 is provided such that the minimum of the distance d2 in the vehicle width direction from the inner surface of the window glass 3 is not less than the safety ensuring distance when the operational speed of the window glass 3 is in the low speed. In addition, the second camera 7b is arranged at a position where the distance in the vehicle width direction from the inner surface of the window glass 3 to the center of the optical system 71 is not less than the safety ensuring distance when the operational speed of the window glass 3 is in the low speed.

Further, the distance between the first detection surface 91 and the second detection surface 92 is a distance that allows to reduce the operational speed of the window glass 3 from the normal speed to the low speed from when the foreign object intrudes through the first detection surface 91 (the first blocked state is detected) to when the foreign object intrudes to the second detection surface 92 by taking into account the intrusion speed of an assumed foreign object etc.

Providing the positions of the camera 7 and the detection lines 61, 62 to satisfy above conditions allows to conduct the pinch prevention operation (i.e., halting or reversing the window glass 3) before contact of the intruding foreign object with the window glass 3 in the entire moving area of the window glass 3.

The relation between foreign object detection and the operational speed of the window glass when the foreign object intrudes while the window glass is lifted will be described by using FIGS. 6A, 6B. As an example, outputting the instruction to halt the window glass 3 to the drive mechanism 4 when the first blocked state is detected will be described. The vertical axis in FIGS. 6A, 6B shows the operational speed of the window glass 3 in a lifting direction.

Figure 6A:
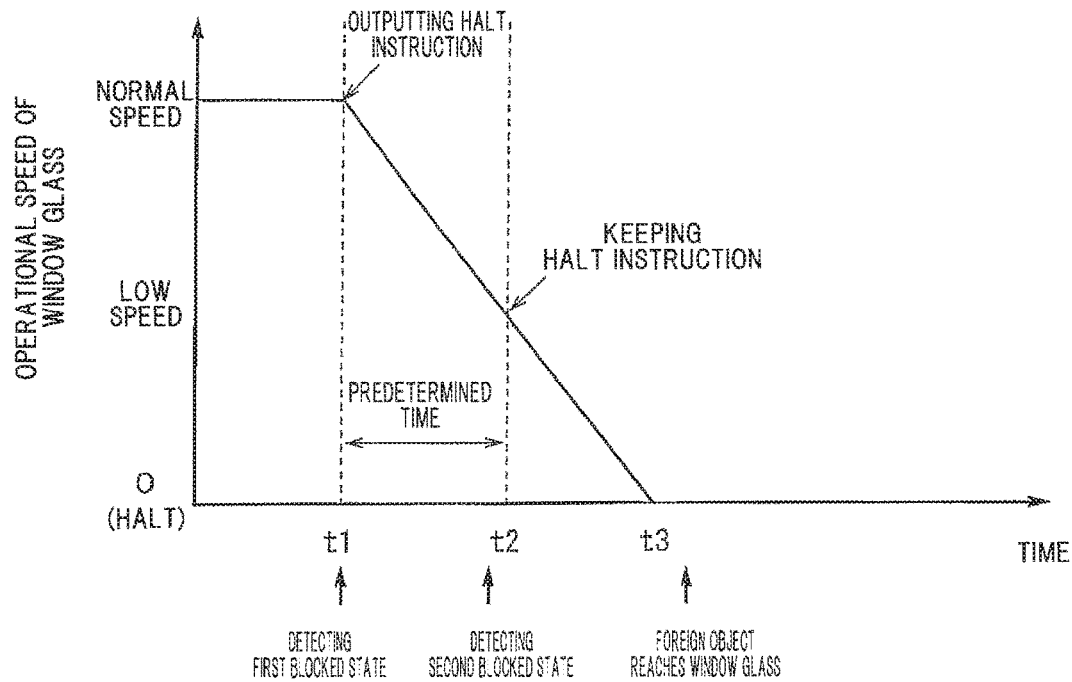
FIG. 6A is a timing diagram illustrating a relation between foreign object detection and operational speed of the window glass when the foreign object intrudes while the window glass is lifted.

As shown in FIG. 6A, in the present embodiment, the operational speed of the window glass 3 is set at the normal speed in the state that the first blocked state and the second blocked state are not detected. When the first blocked state is detected at time t1, the instruction to halt the window glass 3 (halt instruction) is output and the operational speed of the window glass 3 is reduced.

Next, when the second blocked state is detected between the time t1 and time t2, i.e., the preset predetermined time elapses after the first blocked state is detected, the instruction to halt the window glass 3 (the halt instruction) is kept and the window glass 3 is halted before the foreign object reaches the window glass 3 (time t3).

Figure 6B:
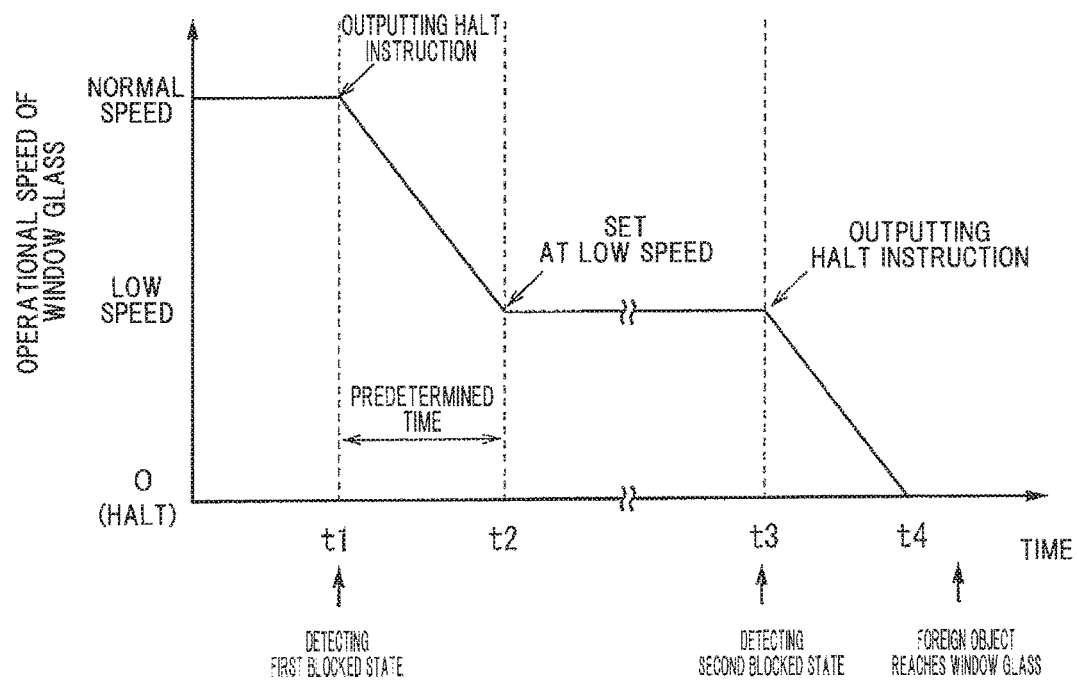
FIG. 6B is a timing diagram illustrating a relation between foreign object detection and the operational speed of the window glass when the foreign object intrudes while the window glass is lifted.

Meanwhile, as shown in FIG. 6B, when the second blocked state is not detected between the time t1 and the time t2, i.e., during preset predetermined time elapses after the first blocked state is detected, the operational speed of the window glass 3 is set at the low speed at the time t2 and the movement of the window glass 3 is kept in low speed. Then, when the second blocked state is detected at the time t3, the pinch prevention operation (in this case, outputting the halt instruction) is conducted and the window glass 3 is halted before the foreign object reaches the window glass 3 (time t4).

As return to FIG. 1, the control unit 5 is further provided with a low speed movement controller 53 to control the drive mechanism 4 to move the window glass 3 in the low speed when the first blocked state is detected and the second blocked state is not detected by the detection unit 51 after the movement of the window glass 3 is instructed by the switch 24 and before when the window glass 3 begins to be moved.

Providing the low speed movement controller 53 can begin the movement of the window glass 3 in the low speed when the first blocked state is detected. In such configuration, i.e., controlling the window glass 3 to be the low speed by detecting the first blocked state immediately after the window glass 3 begins to be moved in the normal speed does not occur. The unnatural behavior of the window glass 3 is prevented. The low speed movement controller 53 is an embodiment of the low speed movement controller means in the present invention.

Moreover, the control unit 5 is further provided with an instruction cancellation unit 54 to cancel the instruction from the switch 24 when the second blocked state is detected by the detection unit 51 after the movement of the window glass 3 is instructed by the switch 24 and before when the window glass 3 begins to be moved.

Providing the instruction cancellation unit 54 further increases safety since the window glass 3 is never moved while the second blocked state is detected. The instruction cancellation unit 54 is an embodiment of instruction cancellation means in the present invention.

Next, control contents in the control unit 5 to prevent intrusion from the vehicle exterior will be described.

In the vehicle window glass lifting device 1 according to the present embodiment, the crime prevention control unit 56 is configured to judge that the foreign object intrudes from the vehicle exterior to the vehicle interior, at least, when a condition that the second blocked state is detected by the detection unit 51 without detecting the first blocked state (in other words, the condition that the second blocked state is detected before the first blocked state) is satisfied, and conduct the crime prevention operation for crime prevention.

When the foreign object moves from the vehicle interior side to the vehicle exterior side, the foreign object crosses the first detection line 61 provided on more vehicle interior side before. Thus, the first blocked state is surely detected before the second blocked state. Also, when the foreign object intrudes from the vehicle exterior to the vehicle interior through the window glass 3, the foreign object crosses the second detection line provided on more vehicle exterior side before. Thus, the second blocked state is surely detected before the first blocked state. In other words, an intrusion direction of the foreign object can be detected whether the first blocked state is detected before or the second blocked state is detected before.

In the present embodiment, the crime prevention control unit 56 is configured to judge that the foreign object intrudes from the vehicle exterior to the vehicle interior when the condition that the second blocked state is detected by the detection unit 51 without detecting the first blocked state, and then the first blocked state is detected while the second blocked state is kept (i.e., the condition that the second blocked state is detected before, and then the first blocked state is detected; which will be hereinafter referred to as "intrusion condition") is satisfied, and conduct the crime prevention operation such that the intrusion direction of the foreign object is surely judged, and the intrusion of the foreign object (such as hand) from the vehicle exterior is surely judged.

In the present embodiment, the crime prevention control unit 56 is configured to lift the window glass 3 automatically as the crime prevention operation when the intrusion condition is satisfied. It is due to threaten to an intruder by lifting the window glass 3 and urge the intruder to pull hand etc. away when the hand etc. intrudes through the opened window glass 3.

In the present embodiment, although the crime prevention control unit 56 is configured to lift the window glass 3 automatically until becoming a fully closed state. It is not limited thereto. Such a space that prevents the intrusion of the intruder's hand may be left.

In addition, since the vehicle window glass lifting device 1 is provided with the safety control unit 55, it is considered that enough crime prevention effect cannot be obtained caused by conducting the safety operation and lowering the window glass 3 when the intruder's hand etc., is pinched while the intrusion condition is satisfied and the window glass 3 is automatically lifted. In the present embodiment, the crime prevention control unit 56 is configured to finish the safety operation after automatically lowering the window glass 3 by preset predetermined distance (predetermined time) when the safety operation is conducted while the second blocked state is kept after the second blocked state is detected by the detection unit 51 without detecting the first blocked state (satisfying the intrusion condition), and thereafter automatically re-lift the window glass 3 as the crime prevention operation.

In such configuration, the window glass 3 is re-lifted after the window glass 3 is slightly lowered even when the intruder's hand etc., is pinched by the window glass 3. Thus, the crime prevention effect can be improved. In such case, the distance (time) to lower the window glass 3 can be suitably aligned to a distance (time) so as not to lost the crime prevention effect.

Furthermore, the crime prevention control unit 56 may be configured to forbid the safety operation when the safety operation and re-lifting the window glass 3 are repeated more than preset threshold number of times. In such configuration, the window glass 3 can be surely closed after conducting the threat to the intruder. Thus, the crime prevention effect can be improved. However, in such case, since the safety operation is not conducted even when pinching by the window glass 3 occurs, it is desirable to cause enough warning (and informing to driver) by using a warning means 57 etc., that will be described below while the safety operation and re-lifting the window glass 3 are repeated so as to prevent causing an accident such as pinching by the window glass 3 by mistake.

Furthermore, in the present embodiment, the crime prevention control unit 56 is configured to forbid the pinch prevention operation by the pinching prevention unit 52 during the second blocked state is kept after the second blocked state is detected by the detection unit 51 without detecting the first blocked state (the intrusion condition is satisfied) as the crime prevention operation. It is due to fail to obtain enough crime prevention effect when the pinch prevention operation is conducted despite of satisfying the intrusion condition and the window glass 3 is halted or lowered.

Moreover, in the present embodiment, the crime prevention control unit 56 is configured to lock the door 2 of the vehicle automatically as the crime prevention operation when the intrusion condition is satisfied. In such configuration, opening of the door 2 by the intruder can be prevented. Thus, the crime prevention effect can be more improved.

In addition, in the present embodiment, the crime prevention control unit 56 is provided with a warning means 57 that cautions by at least any one of light or sound, and is configured to warn by the warning means 57 as the crime prevention operation when the intrusion condition is satisfied. The warning means 57 is to threaten to the intruder and inform causing intrusion for the driver when the driver leaves from the vehicle. For example, a device such as sounding an alarm of vehicle can be used.

The crime prevention control unit 56 may be further provided with an external notification means 58 that communicates with a preset notification object and notifies intrusion of the foreign object from the vehicle exterior to the vehicle interior (the intrusion from the vehicle exterior) to the preset notification object. The crime prevention control unit 56 may be configured to notify to the notification object by the external notification means 58 as the crime prevention operation when the intrusion condition is satisfied. For example, the external notification means 58 may be configured to notify the intrusion from the vehicle exterior for an information center that is as the notification object through preset mobile phone channel etc. The information center may be configured to inform the notification to preset mobile phone or personal computer etc., by E-mail. In addition, the external notification means 58 may be configured to notify the intrusion from the vehicle exterior for a terminal that is the notification object (e.g. a vehicle key that is communicable) by radio communication etc. The external notification means 58 may be configured to conduct the warning operation such as sounding warning sound in the terminal.

In the present embodiment, the crime prevention control unit 56 is configured to monitor the intruder when the window glass 3 is opened regardless of whether vehicle engine is turned on or off, or the key off state or the key on state. When the window glass 3 is opened, the cameras 7a, 7b and controller 5 are constantly booted and conduct the crime prevention control.

Meanwhile, e.g., it may be considered that the driver inserts his hand through the opened window glass 3 to take a baggage in the vehicle interior. To remove such case, the crime prevention control unit 56 may be configured not to conduct the crime prevention operation when the driver is out of the vehicle and near to the vehicle. In such case, although means to detect that the driver is out of the vehicle and near to the vehicle is needed, e.g., means such as using a vehicle key available to communicate, communicating between a communication device mounted on the vehicle and a key, and detecting the location of the driver can be used as such means.

Using only one camera 7 will be described here.

Although using the two cameras 7a, 7b, which is configured to capture the first detection line 61 by the first camera 7a and capture the second detection line 62 by the second camera 7b has been described in the present embodiment, both detection lines 61, 62 can be configured to be captured by one camera 7.

Figure 7:
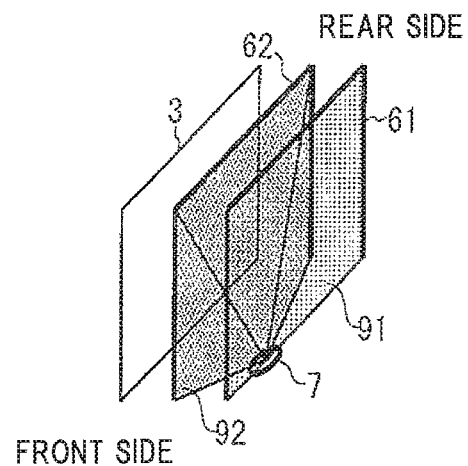
FIG. 7 is a schematic explanatory diagram illustrating a detection surface in a vehicle window glass lifting device according to a comparative example of the present invention.

As an example, the detection surfaces 91, 92 that are provided when the camera 7 is arranged at the position where the distance in the vehicle width direction from the inner surface of the window glass 3 to the center of the optical system 71 is equal to the distance in the vehicle width direction from the inner surface of the window glass 3 in the first detection line 61 will be shown in FIG. 7.

As shown in FIG. 7, when the camera 7 is only one camera, the intrusion direction of the foreign object may not be surely determined at neighborhood of the camera 7 since both detection surfaces 91, 92 are provided closely at the neighborhood of the camera 7. In such case, the neighborhood of the camera 7 becomes dead band and the crime prevention control may not be conducted. Therefore, in terms of surely conducting the crime prevention control, it is desirable to form no dead band that comes close to both detection surfaces 91, 92 by using more than two cameras 7, configuring to capture both detection line 61, 62 by various cameras 7 respectively. Meanwhile, when the top end of the window glass 3 is configured to be located in the window frame 25 if the window glass 3 is not housed in the storage portion 21 completely and the window glass 3 has been moved to the lowest position, and when a region that is the dead band is constantly configured to overlap in the vehicle width direction with the window glass 3, the intrusion direction of the foreign object can be detected by one camera 7 sufficiently since the foreign object is unlikely to intrude from the vehicle exterior to the region that is the dead band.

In addition, when the camera 7 is only one camera, the position of the camera needs to be set at suitable position so as to achieve both safety and convenience.

Figure 8:
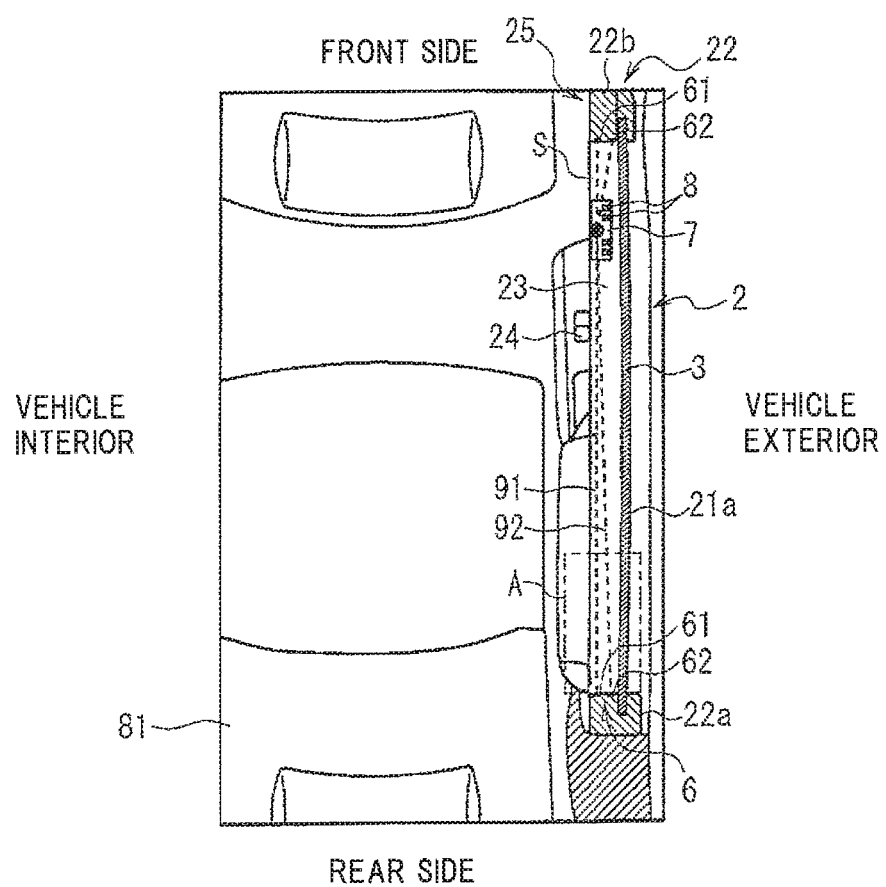
FIG. 8 is an explanatory diagram illustrating the detection surface of FIG. 7 viewed from the upper side.

In vehicle, a seat 81 is generally arranged at a position below the window glass 3 on the rear side as shown in FIG. 8, a part of the passenger's body such as shoulder or head, is likely to come close to the window glass 3 in a region A surrounded by the dot-and-dash line shown in FIG. 8, i.e., a rear region A in the window frame 25. Thus, the second detection surface 92 is desirably arranged to come close to the window glass 3 preferably in the rear region A in the window frame 25 such that the window glass 3 can be moved even when the passenger reclines to the door 2.

Figure 9:
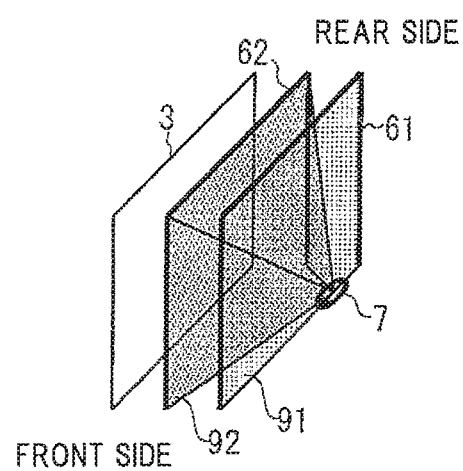
FIG. 9 is an explanatory diagram illustrating the position provided with the camera.

For example, as shown in FIG. 9, the second detection surface 92 is arranged at a position far from the window glass 3 in the rear area of vehicle when the camera 7 is arranged at a rear position of vehicle. It may be unable to move the window glass 3 when the passenger reclines to the door 2. Therefore, it is desirable to arrange the camera 7 at the front side of the window frame 25 preferably and arrange the camera 7 so as to come close to the window glass 3 preferably such that convenience in the rear area A in the above window frame 25 is improved.

The camera 7 is desirably arranged at, at least a position anterior to, in the front-back direction of the vehicle, the center of the window glass 3 in the inner circumferential surface of the window frame 25 when the camera 7 is arranged at the vehicle interior side of the second detection line 62, depending on the position of the seat, the physical size of the passenger etc. In other words, the camera 7 is desirably arranged at a position anterior to the center (the center in the front-back direction of the vehicle) of the window glass 3 in the upper surface S of the door trim 23 or the surface of the upper extended portion 22c on the lower side, or the rear side surface of the front upright portion 22b.

Meanwhile, although the positions of the camera 7 and the detection lines 61, 62 are determined such that the entire moving area of the window glass 3 becomes the non-contact region that allows to conduct the pinch prevention operation before the foreign object comes into contact with the window glass 3 even if the foreign object intrudes, it is not limited thereto. A part of lower area in the moving area of the window glass 3 may be the contact region.

Figure 10A:
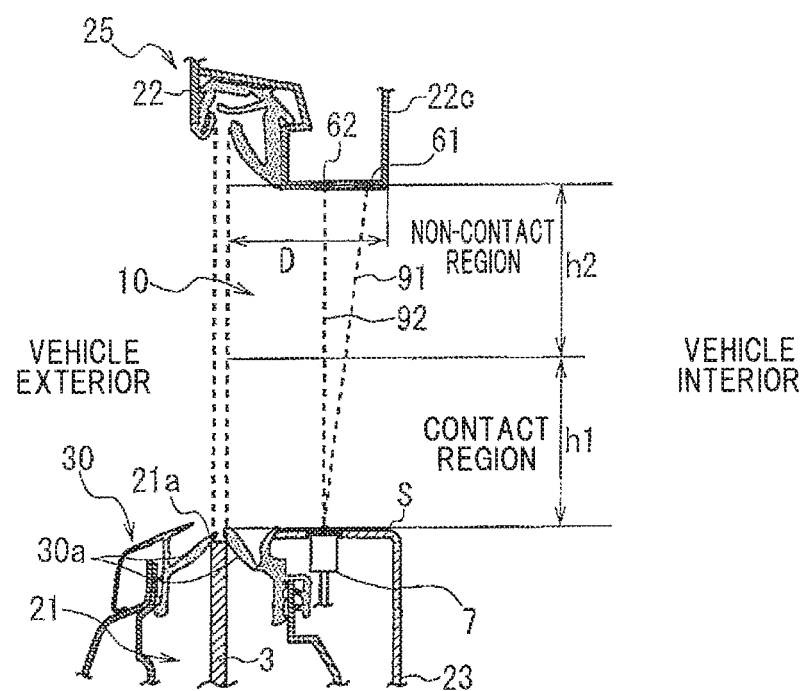
FIG. 10A is a cross sectional view illustrating a cross section taken along lines 4A-4A of FIG. 2 in a vertical direction of a door at the position including a camera in a vehicle window glass lifting device according to a comparative example of the present invention.
Figure 10B:
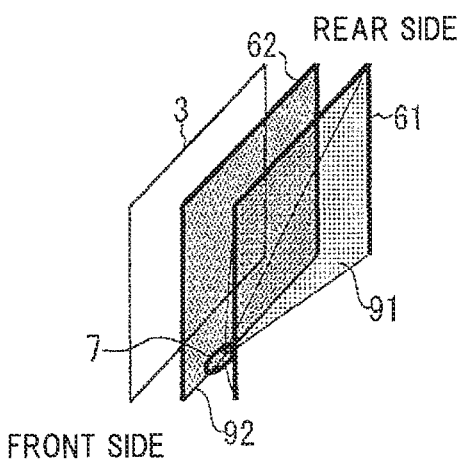
FIG. 10B is a schematic explanatory diagram illustrating a detection surface of FIG. 10A.

For example, as shown in FIGS. 10A, 10B, when the camera 7 is arranged at a position where the distance from the window glass 3 in the vehicle width direction is less than the safety ensuring distance when the operational speed of the window glass 3 is set at the normal speed, a region near the camera 7 is the contact region where the foreign object may come into contact with the moving window glass 3 even if the pinch prevention operation is conducted after the foreign object is detected.

When the camera 7 is arranged on the upper surface S of the door trim 23 as shown in FIGS. 10A, 10B, the part of the lower area in the moving area of the window glass 3 becomes the contact region. In the lower area in the moving area of the window glass 3, although the foreign object may come into contact with the moving window glass 3, it is unlikely that the foreign object is pinched between the window glass 3 and the upper extended portion 22c since the pinch prevention operation is conducted just after the foreign object comes into contact with the window glass 3.

FIGS. 10A, 10B show the second detection line 62 and the camera 7 provided at positions where the distances in the vehicle width direction from the inner circumferential surface of the window glass 3 are equal. In such configuration, when a distance in the vehicle width direction between the second detection line 62 and the inner circumferential surface of the window glass 3 is constant, the second detection surface 92 is provided in parallel to the window glass 3.

In this case, since the distance between the second detection surface 92 and the window glass 3 is constant in the entire moving area of the window glass 3, sufficient convenience can be ensured even if the camera 7 is arranged at the rear area of the window frame 25 (the area A described above). In other words, amount of freedom of the installed position of the camera 7 improves.

Meanwhile, since pinching by the window glass 3 is likely to occur at a closing end of the window frame 25, i.e., in an upper region of the moving area of the window glass 3, in such a case, the camera 7 is desirably arranged at, at least a lower position in the height direction than the center of the window glass 3 in the inner circumferential surface of the window frame 25 such that the contact surface is preferably provided on the lower side.

It is desirable that the height h2 of the non-contact region be as large as possible without departing from convenience and the height h1 of the contact region as small as possible to ensure higher safety. In detail, judging from the actual pinching accidents, serious accidents occur especially when a head of child of three years of age gets caught by the window glass 3. Considering that an average head height of three-year-old children is 191 mm, the height h2 of the non-contact region is desirably at least not less than 200 mm.

Although using one camera 7 has been described in FIGS. 10A, 10B, a part of lower area in the moving area of the window glass 3 may be the contact region when there are any limits such as the installed position of the camera 7 if more than two cameras 7 are used.

As described in FIGS. 7 to 10B, when one camera 7 is used so as to achieve both safety and convenience, the installed position of the camera 7 is limited. Meanwhile, when more than two cameras 7 are used, the amount of freedom in the installation of the camera 7 is high and it allows to set layouts of both detection surfaces 91, 92 individually. Meanwhile, the cameras 7 can be arranged at not only the inner circumferential surface of the window frame 25 but also any positions in the vehicle interior.

Next, a control flow of the vehicle window glass lifting device 1 will be described by using FIGS. 11 to 14.

Figure 11:
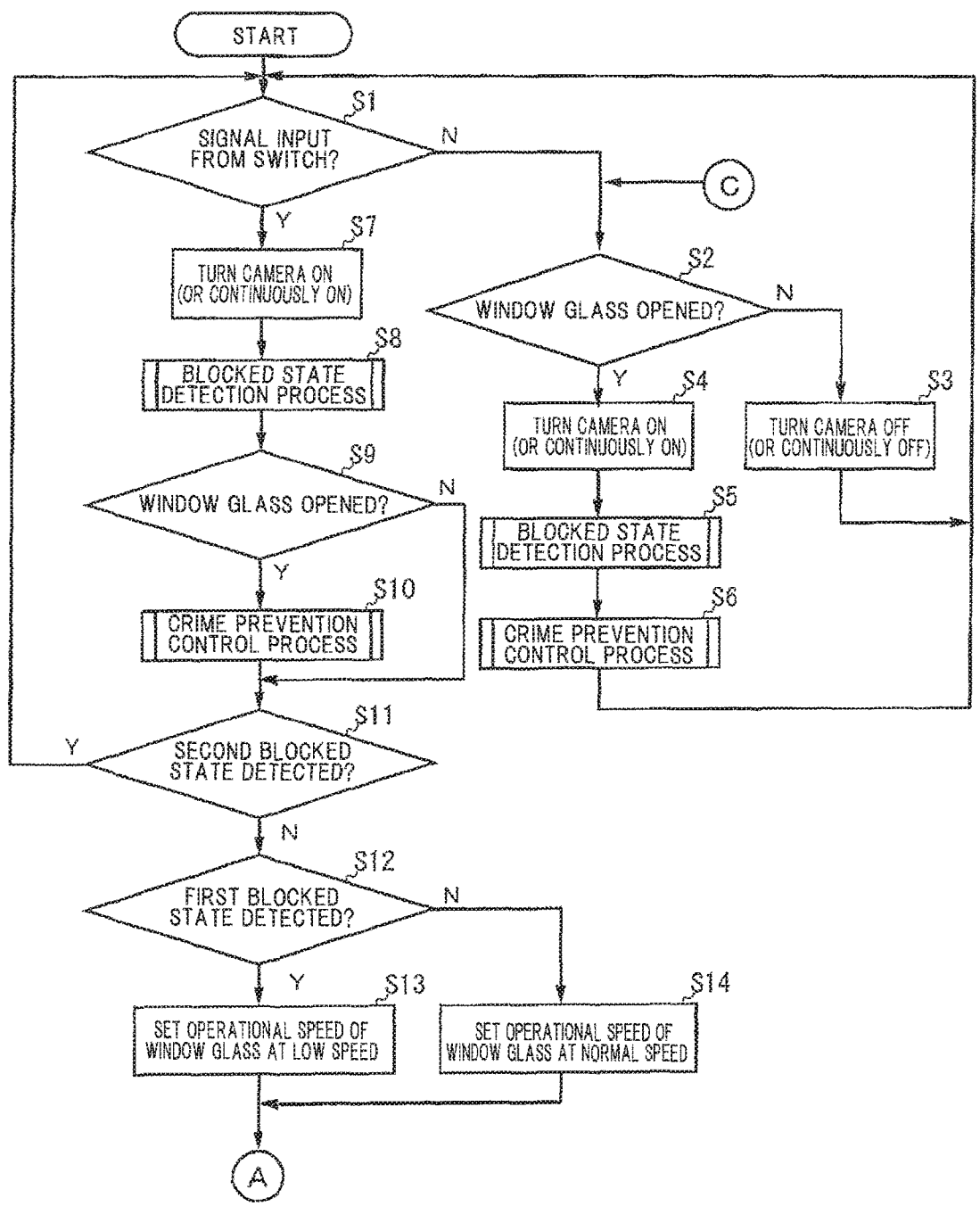
FIG. 11 is a flow chart showing a pinch prevention control flow of the vehicle window glass lifting device in the above embodiment and the comparative example.

As shown in FIG. 11, the vehicle window glass lifting device 1 is configured such that the control unit 5 firstly judges whether or not a signal is input from the switch 24 at Step S1. If judged as NO at Step S1, the control unit 5 judges whether or not the window glass 3 is opened at Step S2. If judged as NO at Step S2, the control unit 5 controls cameras 7a, 7b to be turned off (or kept in the off-state) at Step S3 and the flow is allowed to return to Step S1. If the light sources 8 are turned on at this stage, the light sources 8 are also turned off at Step S3, though it is not shown in the drawing.

If judged as YES at Step S2, the cameras 7a, 7b are controlled to be turned on (or kept in the on-state) at Step S4 and the flow is allowed to proceed to Step S4. If the illumination intensity to capture an image by the cameras 7a, 7b is not enough, the light sources 8 are turned on at Step S5, though it is not shown in the drawing.

At Step S5, the detection unit 51 (i.e., the image processing section 51a and the blocked state determination section 51b) conducts a processing of detecting the first blocked state and the second blocked state (i.e., a blocked state detection processing) based on the image captured by the cameras 7a, 7b. After that, a crime prevention control processing is conducted at Step S6 and the flow is allowed to return to Step S1. The crime prevention control processing will be described below.

If judged as YES at Step S1, the control unit 5 controls the cameras 7a, 7b to be turned on (or kept in the on-state) at Step S7 and the flow is allowed to proceed to Step S8. If the illumination intensity to capture an image by the cameras 7a, 7b is not enough, the light sources 8 are turned on at Step S7, though it is not shown in the drawing.

At Step S8, the detection unit 51 (i.e., the image processing section 51a and the blocked state determination section 51b) conducts a processing of detecting the first blocked state and the second blocked state (i.e., a blocked state detection processing) based on the image captured by the cameras 7a, 7b.

After that, at Step S9, the control unit 5 judges whether or not the window glass 3 is opened. If judged as YES at Step S9, the crime prevention control processing is conducted at Step S10 and the flow is allowed to proceed to Step S11. The crime prevention control processing will be described below. If judged as NO at Step S9, since the window glass 3 is closed and the crime prevention control processing is not necessary to be conducted, the flow is allowed to proceed to Step S11.

At Step S11, the instruction cancellation unit 54 judges whether or not the second blocked state is detected by the detection unit 51. If judged as YES at Step S11, the instruction cancellation unit 54 determines that there is a risk of being pinched by the window glass 3 and the flow is allowed to return to Step S1 without moving the window glass 3 (i.e., the signal from the switch 24 is cancelled).

If judged as NO at Step S11, at Step S12, the low speed movement controller 53 judges whether or not the first blocked state is detected by the blocked state detection processing at Step S8.

Figure 12:
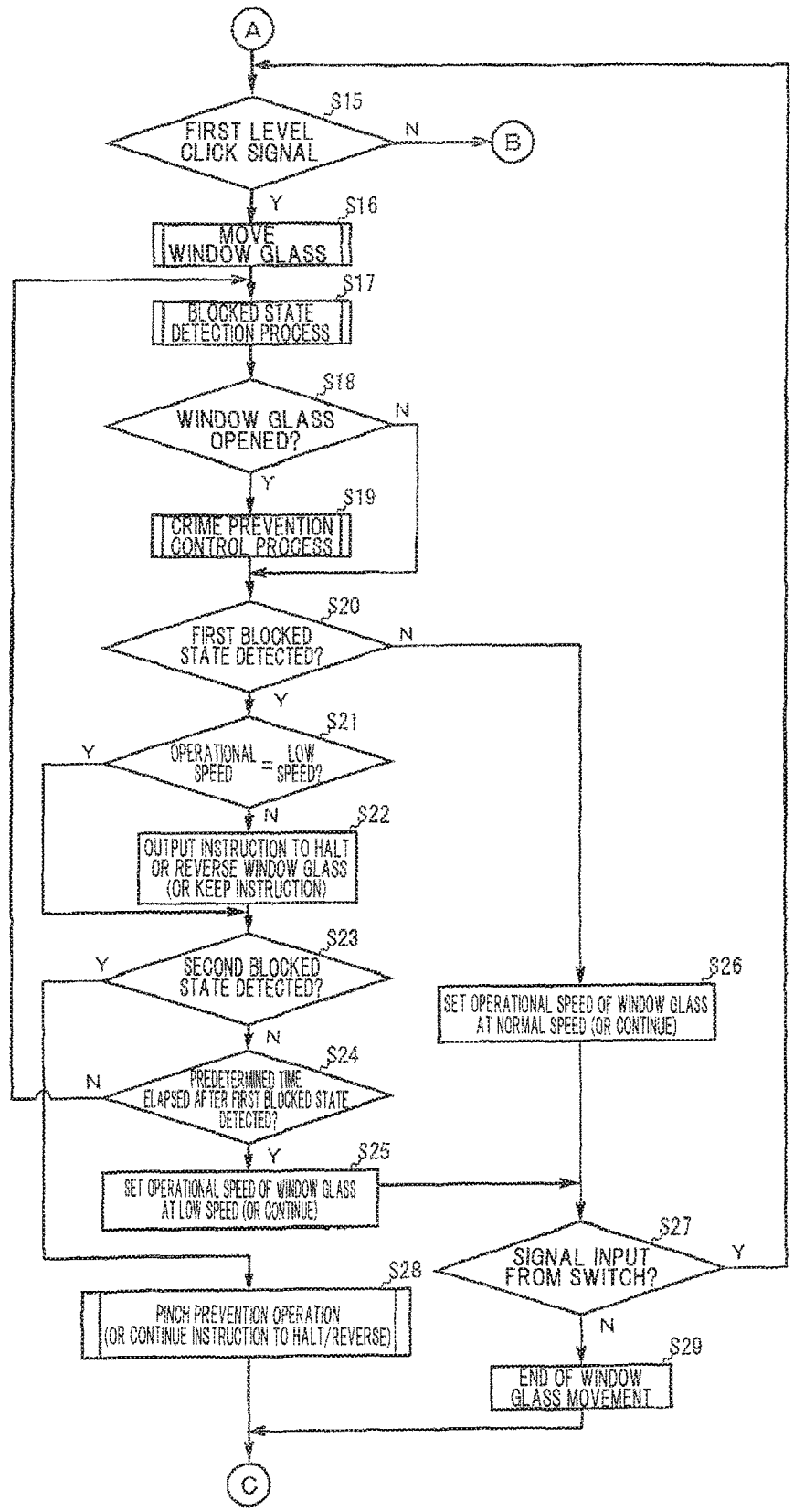
FIG. 12 is a flow chart showing a pinch prevention control flow of the vehicle window glass lifting device in the above embodiment and the comparative example.

If judged as YES at Step S12, the operational speed of the window glass 3 is set at the low speed at Step S13 and the flow is allowed to proceed to Step S15 in FIG. 12. If judged as NO at Step S12, the operational speed of the window glass 3 is set at the normal speed at Step S14 and the flow is allowed to proceed to Step S15 in FIG. 12.

As shown in FIG. 12, at Step S15, the control unit 5 judges whether or not the signal input from the switch 24 is a first level click signal (lowering side first level click signal or lifting side first level click signal).

Figure 13:
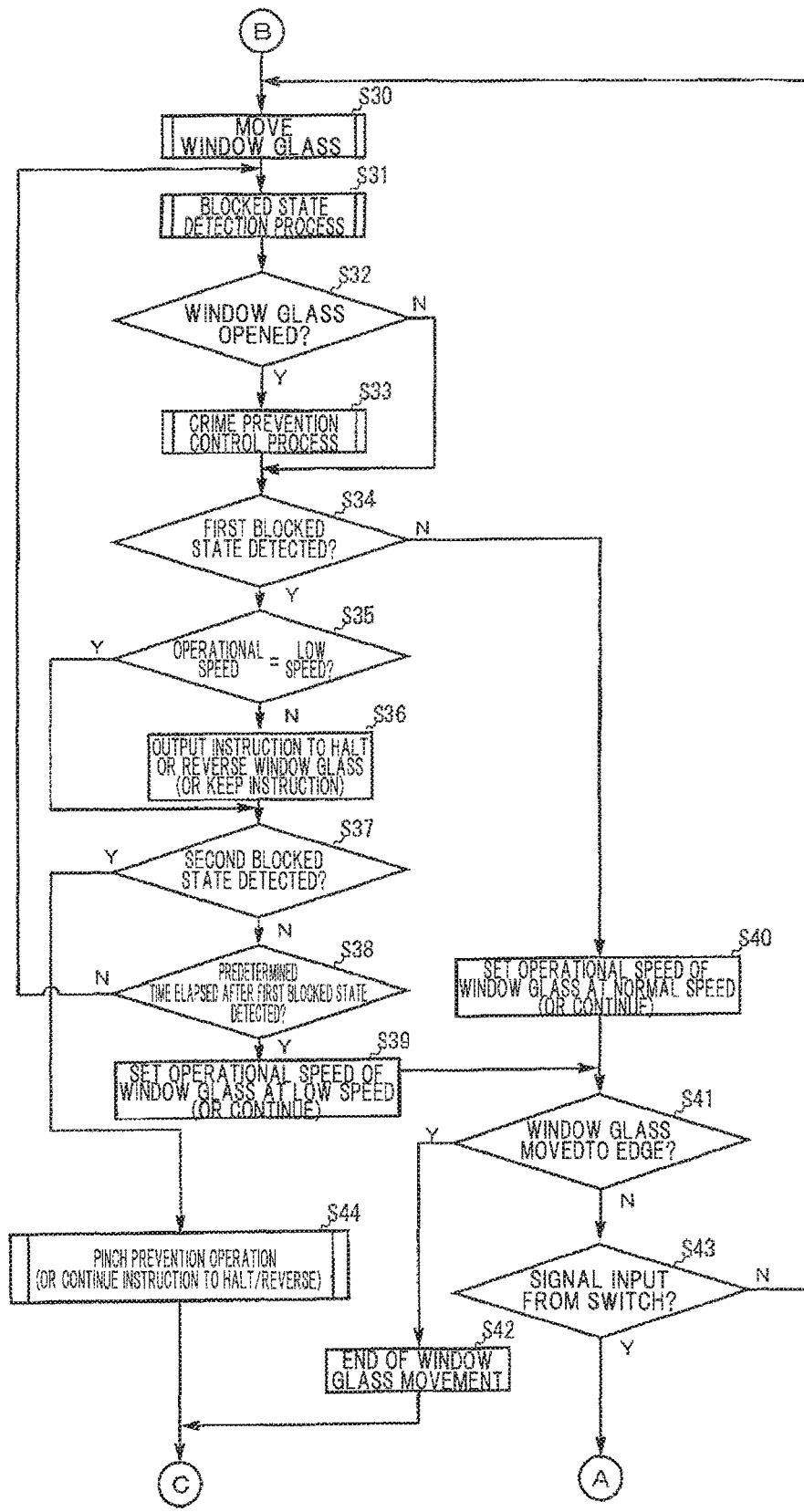
FIG. 13 is a flow chart showing a pinch prevention control flow of the vehicle window glass lifting device in the above embodiment and the comparative example.

If judged as NO at Step S15, i.e., a second level click signal (lowering side second level click signal or lifting side second level click signal) in input from the switch 24, the flow is allowed to proceed to Step S30 in FIG. 13. If judged as YES at Step S15, the control unit 5 instructs the drive mechanism 4 to control the movement of the window glass 3 at the set operational speed at Step S16.

After that, at Step S17, the detection unit 51 conducts a processing of detecting the first blocked state and the second blocked state (i.e., a blocked state detection processing) based on the image captured by the cameras 7a, 7b. After that, at Step S18, the control unit 5 judges whether or not the window glass 3 is opened. If judged as YES at Step S18, the crime prevention control processing is conducted at Step S19 and the flow is allowed to proceed to Step S20. The crime prevention control processing will be described below. If judged as NO at Step S18, since the window glass 3 is closed and the crime prevention control processing is not necessary to be conducted, the flow is allowed to proceed to Step S20.

At Step S20, the pinching prevention unit 52 judges whether or not the first blocked state is detected by the detection unit 51. If judged as NO at Step S20, since it is considered that the first blocked state is not detected and the foreign object does not intrude near the window glass 3, the operational speed of the window glass 3 is set at (or kept at) the normal speed at Step S26 and the flow is allowed to proceed to Step S27.

If judged as YES at Step S20, the pinching prevention unit 52 judges whether or not the operational speed of the window glass 3 is set at the low speed at Step S21. If judged as YES at Step S21, since the control to reduce the operational speed of the window glass 3 is not necessary, the flow is allowed to proceed to Step S23.

If judged as NO at Step S21, the pinching prevention unit 52 outputs instructions to halt or reverse the window glass 3 to the drive mechanism 4 so as to reduce the operational speed of the window glass 3 at Step S22 and the flow is allowed to proceed to Step S23. Meanwhile, at Step S22, the instruction to halt the window glass 3 is output when the window glass 3 is lowered.

At Step S23, the pinching prevention unit 52 judges whether or not the second blocked state is detected in the blocked state detection processing at Step S19. If judged as YES at Step S23, the pinch prevention operation is conducted (or the instruction at Step S22 is kept) at Step S28 and the flow is allowed to proceed to Step S2 in FIG. 11.

If judged as NO at Step S23, the pinching prevention unit 52 judges whether or not the predetermined time elapses after the first blocked state is detected at Step S24. If judged as NO at Step S24, since it is considered that the operational speed of the window glass 3 already becomes the low speed or it is in the way to reduce the speed of the window glass 3 by outputting the instructions to halt or reverse the window glass 3, the flow is allowed to return to Step S17, and the blocked state detection processing is maintained.

If judged as YES at Step S24, the operational speed of the window glass 3 is set at (or kept at) the low speed at Step S25 and the flow is allowed to proceed to Step S27.

At Step S27, the control unit 5 judges whether or not a signal is input from the switch 24. If judged as NO at Step S27, this means that an operation on the switch 24 is finished. Accordingly, the control unit 5 terminates the movement of the window glass 3 at Step S29 and the flow is allowed to return to Step S2 in FIG. 11. If judged as YES at Step S27, the flow is allowed to return to Step S15 and the window glass 3 is kept moving.

As shown in FIG. 13, at Step S30, the control unit 5 instructs the drive mechanism 4 to control the movement of the window glass 3 at the predetermined operational speed.

After that, at Step S31, the detection unit 51 conducts a processing of detecting the first blocked state and the second blocked state (i.e., a blocked state detection processing) based on the image captured by the cameras 7a, 7b. After that, at Step S32, the control unit 5 judges whether or not the window glass 3 is opened. If judged as YES at Step S32, the crime prevention control processing is conducted at Step S33 and the flow is allowed to proceed to Step S34. The crime prevention control processing will be described below. If judged as NO at Step S32, since the window glass 3 is closed and the crime prevention control processing is not necessary to be conducted, the flow is allowed to proceed to Step S34.

At Step S34, the pinching prevention unit 52 judges whether or not the first blocked state is detected by the detection unit 51. If judged as NO at Step S34, since it is considered that the first blocked state is not detected and the foreign object fails to intrude near the window glass 3, the operational speed of the window glass 3 is set at (or kept at) the normal speed at Step S40 and the flow is allowed to proceed to Step S41.

If judged as YES at Step S34, the pinching prevention unit 52 judges whether or not the operational speed of the window glass 3 is set at the low speed at Step S35. If judged as YES at Step S35, since the control to reduce the operational speed of the window glass 3 is not necessary, the flow is allowed to proceed to Step S37.

If judged as NO at Step S35, the pinching prevention unit 52 outputs the instructions to halt or reverse the window glass 3 to the drive mechanism 4 so as to reduce the operational speed of the window glass 3 at Step S36 and the flow is allowed to proceed to Step S37. Meanwhile, when the window glass 3 is lowered, the instruction to halt the window glass 3 is output at Step S36.

At Step S37, the pinching prevention unit 52 judges whether or not the second blocked state is detected in the blocked state detection processing at Step S23. If judged as YES at Step S37, the pinch prevention operation is conducted (or the instruction at Step S36 is kept) at Step S44 and the flow is allowed to proceed to Step S2 in FIG. 11.

If judged as NO at Step S37, the pinching prevention unit 52 judges whether or not the predetermined time elapses after the first blocked state is detected at Step S38. If judged as NO at Step S38, since it is considered that the operational speed of the window glass 3 already becomes the low speed or it is in the way to reduce the speed of the window glass 3 by outputting the instructions to halt or reverse the window glass 3, the flow is allowed to return to Step S31, and the blocked state detection processing is maintained.

If judged as YES at Step S38, the operational speed of the window glass 3 is set at (or kept at) the low speed at Step S39 and the flow is allowed to proceed to Step S41.

At Step S41, the control unit 5 judges whether or not the window glass 3 is moved to an edge (to the top or bottom end). If judge as YES at Step S41, the control unit 5 terminates the movement of the window glass 3 at Step S42 and the flow is allowed to return to Step S2 in FIG. 11. Meanwhile, the positional information of the window glass 3 may be obtained by using a rotational pulse generated by a Hall IC incorporated in the motor 41, or using current ripple.

If judged as NO at Step S41, it is judged whether or not a new signal is input from the switch 24 (i.e., whether or not a new signal is input after the second-level click signal is input) at Step S43. If judged as YES at Step S43, the flow is allowed to return to Step S15 in FIG. 12. If judged as NO at Step S43, the flow is allowed to return to Step S30 and the window glass 3 is kept moving. That is, if the second-level click signal is input, the window glass 3 is kept moving until the second blocked state is detected, the window glass 3 is moved to an edge or a new signal is input from the switch 24.

Next, a control flow of the crime prevention control processing at Steps S6, S10, S19, S33 will be described.

Figure 14:
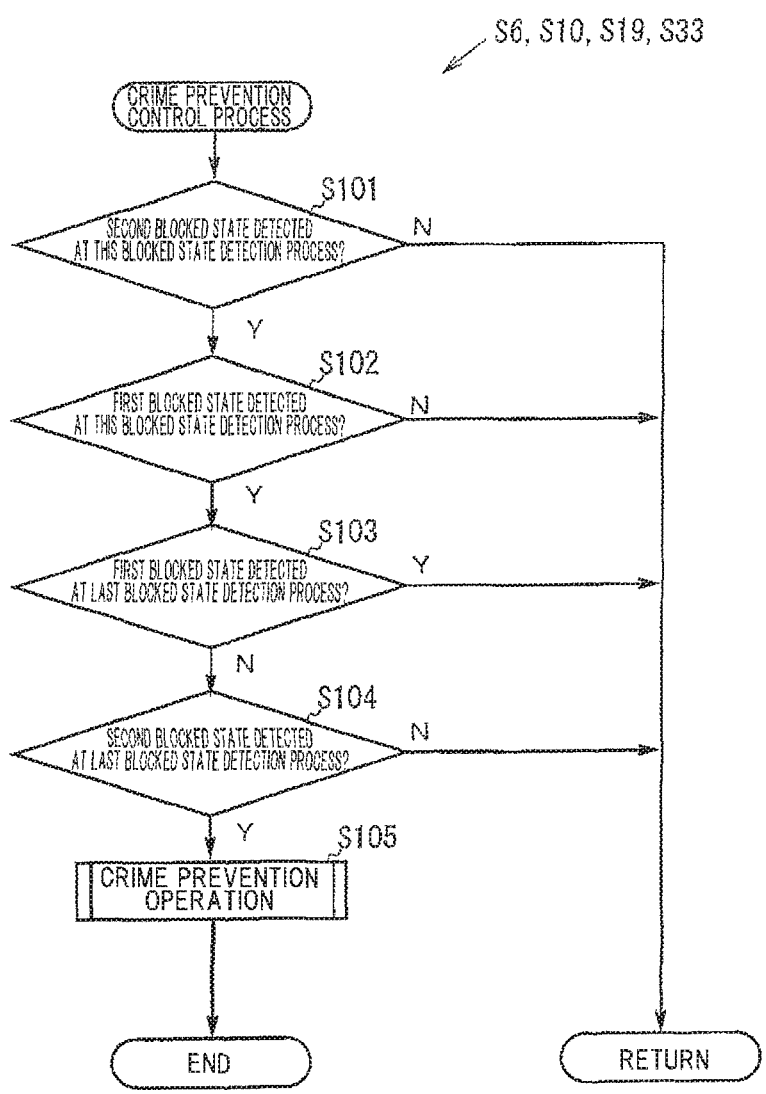
FIG. 14 is a flow chart showing a crime prevention control flow of the vehicle window glass lifting device in the above embodiment and the comparative example.

As shown in FIG. 14, in the crime prevention control processing, the crime prevention control unit 56 firstly judges whether or not the second blocked state is detected in this blocked state detection processing (last blocked state detection processing) at Step S101. If judged as NO at Step S101, the flow is allowed to return.

If judged as YES at Step S101, the crime prevention control unit 56 judges whether or not the first blocked state is detected in this blocked state detection processing (the last blocked state detection processing) at Step S102. If judged as NO at Step S102, the flow is allowed to return.

If judged as YES at Step S102, both first blocked state and second blocked state are detected in this blocked state detection processing. In such case, the crime prevention control unit 56 judges whether or not the first blocked state is detected in the last blocked state detection processing (one time the before the last blocked state detection processing) at Step S103. If judged as YES at Step S103, the flow is allowed to return.

If judged as NO at Step S103, the crime prevention control unit 56 judges whether or not the second blocked state is detected in the last blocked state detection processing (one time before the last blocked state detection processing) at Step S104. If judged as NO at Step S104, the flow is allowed to return.

If judged as YES at Step S104, since the intrusion condition that the second blocked state is detected without detecting the first blocked state in the last blocked state detection processing (one time before the last blocked state detection processing) and the first blocked state is detected in this blocked state detection processing while keeping the second blocked state is satisfied, the crime prevention operation such as lifting the window glass 3 automatically is conducted and the processing is finished.

Functions and Effects of the Embodiment

As described above, the vehicle window glass lifting device 1 comprises the camera 7 for capturing an image of the detection line 6 provided along at least a part of an outer edge of the window glass 3 in a state that the door 2 and the window glass 3 are closed, wherein the detection line 6 comprises at least the first detection line 61, and the second detection line 62 provided on the vehicle exterior side of the first detection line 61, wherein the control unit 5 comprises the detection unit 51 for detecting the first blocked state in which the first detection line 62 captured in an image by the camera 7 is at least partially blocked by a foreign object and the second blocked state in which the second detection line 62 captured in an image by the camera 7 is at least partially blocked by a foreign object, and the crime prevention control unit 56 that determines that a foreign object intrudes from the vehicle exterior to a vehicle interior and conducts a crime prevention operation to a crime prevention when a condition that the second blocked state is detected by the detection unit 51 without detecting the first blocked state is satisfied.

In such configuration, the crime prevention operation such as lifting the window glass 3 automatically when the intruder's hand etc. intrudes through the opened window glass 3 to the vehicle interior can be conducted and the vehicle window glass lifting device 1 that allows to achieve the crime prevention against the intrusion from the vehicle exterior can be achieved.

In the present embodiment, since the crime prevention control unit 56 is configured to determine that a foreign object intrudes from the vehicle exterior to the vehicle interior and conducts the crime prevention operation when a condition that the second blocked state is detected by the detection means without detecting the first blocked state and thereafter the first blocked state is detected by the detection means while keeping the second blocked state is satisfied, the intrusion direction of the foreign object can be surely determined. Thus, the erroneous crime prevention operation can be prevented.

In addition, in the present embodiment, since the crime prevention operation conducted by the crime prevention control unit 56 comprises an operation to finish the safety control operation after the window glass 3 is automatically lowered by a preset predetermined distance and thereafter the window glass 3 is automatically re-lifted while the second blocked state is kept after the second blocked state is detected by the detection means 51 without detecting the first blocked state, the crime prevention effect can be obtained even when the safety control unit 55 is provided, and features to the crime prevention and the pinching prevention can be achieved together.

Furthermore, in the present embodiment, since the crime prevention operation conducted by the crime prevention control unit 56 comprises an operation to forbid the pinch prevention operation, the crime prevention effect can be obtained even when the pinching prevention unit 52 is provided, and features to the crime prevention and the pinching prevention can be achieved together.

Furthermore, in the present embodiment, configuring to detect the first blocked state based on an image captured by the first camera 7a, and the second blocked state based on an image captured by the second camera 7b, the intrusion of the foreign object from the vehicle exterior can be monitored in the entire moving area of the window glass 3 including the neighborhood of the cameras 7a, 7b. The crime prevention effect can be more improved.

In the present embodiment, the first detection line 61 and the second detection line 62 are provided on the vehicle interior side of the window glass 3, and the pinching prevention unit 52 is configured to cause the drive mechanism 4 to conduct the operation to reduce the operational speed of the window glass 3 when the first blocked state is detected while the window glass 3 is moved and to conduct the pinch prevention operation when the second blocked state is detected.

In such configuration, sufficient safety can be ensured even if the second detection line 62 (the second detection surface 92) that is a reference to conduct the pinch prevention operation is provided closer to the window glass 3 comparing to providing only one detection line (detection surface). As a result, e.g., even when the passenger reclines to the door 2, the window glass 3 can be moved at least the low speed when the second blocked state is not detected and it is unlikely to cause pinching by the window glass 3, hence, convenience is improved.

As such, according to the present embodiment, while keeping sufficient safety, it is possible to prevent a problem such that the pinch prevention operation is conducted despite no risk of getting pinched by the window glass 3 and the window glass 3 cannot be moved even when intended to move, hence, convenience is improved.

SUMMARY OF THE EMBODIMENT

Technical ideas understood from the embodiment will be described below citing the reference numerals, etc., used for the embodiment. However, each reference numeral, etc., described below is not intended to limit the constituent elements in the claims to the members, etc., specifically described in the embodiment.

One embodiment is a vehicle window glass lifting device (1), comprising:
  a drive mechanism (4) arranged on a vehicle door (2) to vertically move a window glass (3);
  a control unit (5) for controlling the drive mechanism (4); and
  a camera (7) for capturing an image of a detection line (6) provided along at least a part of an outer edge of the window glass (3) in a state that the door (2) and the window glass (3) are closed,
  wherein the detection line (6) comprises at least a first detection line (61), and a second detection line (62) provided on a vehicle exterior side of the first detection line (61),
  wherein the control unit (5) comprises a detection means (51) for detecting a first blocked state in which the first detection line (61) captured as the image by the camera (7) is at least partially blocked by a foreign object and a second blocked state in which the second detection line (62) captured as the image by the camera (7) is at least partially blocked by a foreign object, and a crime prevention control means (56) that determines that a foreign object intrudes from the vehicle exterior to a vehicle interior and conducts a crime prevention operation to a crime prevention when a condition that the second blocked state is detected by the detection means (51) without detecting the first blocked state is satisfied.

One embodiment is the window glass lifting device (1) for a vehicle wherein the crime prevention control means (56) is configured to determine that a foreign object intrudes from the vehicle exterior to the vehicle interior and conducts the crime prevention operation when a condition that the second blocked state is detected by the detection means (51) without detecting the first blocked state is satisfied and thereafter the first blocked state is detected by the detection means while keeping the second blocked state.

One embodiment is the vehicle window glass lifting device (1), wherein the crime prevention operation comprises an operation to lift the window glass automatically.

One embodiment is the vehicle window glass lifting device (1), comprising a safety control unit (55) causing the drive mechanism (4) to conduct a safety control operation to detect pinching by the window glass (3) and reverse a moving direction of the window glass (3) and lower automatically when pinching occurs,
  wherein the crime prevention operation comprises an operation to finish the safety control operation after the window glass (3) is automatically lowered by a preset predetermined distance and thereafter the window glass (3) is automatically re-lifted while the second blocked state is kept after the second blocked state is detected by the detection means (51) without detecting the first blocked state.

One embodiment is the vehicle window glass lifting device (1), wherein the camera (7) comprises at least a first camera (7a) for capturing the first detection line (61) and a second camera (7b) for capturing the second detection line (62), and wherein the detection means (51) is configured to detect at least the first blocked state based on an image captured by the first camera (7a), and the second blocked state based on an image captured by the second camera (7b).

One embodiment is the vehicle window glass lifting device (1), wherein the control unit (5) comprises a pinching prevention means (62) that causes the drive mechanism (4) to conduct a pinch prevention operation for preventing pinching by the window glass (3) when the first blocked state or the second blocked state is detected while the window glass (3) is moved, and wherein the crime prevention operation comprises an operation to forbid the pinch prevention operation.

One embodiment is the vehicle window glass lifting device (1), wherein the first detection line (61) and the second detection line (62) are provided on the vehicle interior side of the window glass (3), and wherein the pinching prevention means (52) is configured to cause the drive mechanism (4) to conduct a control to reduce an operational speed of the window glass (3) when the first blocked state is detected while the window glass (3) is moved, and cause the drive mechanism (4) to conduct the pinch prevention operation when the second blocked state is detected.

One embodiment is the vehicle window glass lifting device (1), wherein the crime prevention operation comprises an operation to lock the door (2) of the vehicle.

One embodiment is the vehicle window glass lifting device (1), comprising a warning means (57) that cautions by at least any one of light or sound, wherein the crime prevention operation comprises an operation to caution by the warning means (57).

One embodiment is the vehicle window glass lifting device (1), comprising an external notification means (58) that communicates with a preset notification object and notifies to the notification object that a foreign object intrudes from the vehicle exterior to the vehicle interior, wherein the crime prevention operation comprises an operation to notify by the external notification means (58).

One embodiment is a vehicle comprising the vehicle window glass lifting device (1).

Although the embodiment of the invention has been described, the invention according to claims is not to be limited to the above-mentioned embodiment. Further, please note that all combinations of the features described in the embodiment are not necessary to solve the problem of the invention.

The invention can be appropriately modified and implemented without departing from the gist thereof.

For example, although the two detection lines 6 providing the first detection line 61 and the second detection line 62 (providing the two detection surfaces 91, 92) has been described in the present embodiment, it is not limited thereto. For example, a number of the detection lines 6 (a number of the detection surfaces) may be not less than three. In such case, the crime prevention control unit 56 may be configured to detect the intrusion direction of the foreign object by using any two detection lines 6.

In addition, in such case, the pinching prevention unit 52 may be configured such that the operational speed of the window glass 3 is steeply reduced according as the foreign object comes close from the vehicle interior side to the window glass 3 side. Specifically, e.g., when the third detection line is provided at the vehicle interior side of the first detection line 61 and a third blocked state in which the third detection line is blocked by the foreign object is detected in the above embodiment, the vehicle window glass lifting device 1 may be configured to reduce the operational speed of the window glass 3 to a first low speed that is lower than the normal speed, reduce the operational speed of the window glass 3 to the second low speed that is lower than the first low speed when the first blocked state is detected, and conduct the pinch prevention operation when the second blocked state is detected.

In addition, although the invention is applied to a rear door 2 of vehicle in the embodiment, it is not limited thereto. The invention is also applicable to front doors of vehicle.

Furthermore, the invention is applied to the door 2 having the frame portion 22 in the embodiment, but is also applicable to doors of hardtop which do not have the frame portion 22 on the door 2 side.

Furthermore, although the vehicle window glass lifting device 1 provided with both safety control unit 55 and pinching prevention unit 52 has been described in the above embodiment, the present invention can be applied to be provided with any one of the safety control unit 55 and the pinching prevention unit 52, and not to be provided with both safety control unit 55 and pinching prevention unit 52.

In addition, the present invention can be applied when the feature to lift the window glass 3 automatically (the feature to automatically move the window glass 3 corresponding to the second level click signal described above toward the top or the bottom). In such case, the crime prevention control unit 56 can be configured to lift the window glass 3 automatically and close the window glass 3 upon intrusion from the vehicle exterior.

INDUSTRIAL APPLICABILITY

The present invention can be applied to the vehicle window glass lifting device provided with a mechanism to prevent pinching by the window glass when the window glass is automatically moved.

REFERENCE SIGNS LIST

1 VEHICLE WINDOW GLASS LIFTING DEVICE
2 DOOR (VEHICLE DOOR)
3 WINDOW GLASS
4 DRIVE UNIT
5 CONTROL UNIT
6 DETECTION LINE
7 CAMERA
25 WINDOW FRAME
51 DETECTION UNIT (DETECTION MEANS)
52 PINCHING PREVENTION UNIT (PINCHING PREVENTION MEANS)
53 LOW SPEEED MOVEMENT CONTROLLER (LOW SPEED MOVEMENT CONTROL MEANS)
54 INSTRUCTION CANCELLATION UNIT (INSTRUCTION CANCELLATION MEANS)
55 SAFETY CONTROL UNIT
56 CRIME PREVENTION CONTROL UNIT (CRIME PREVENTION CONTROL MEANS)
61 FIRST DETECTION LINE
62 SECOND DETECTION LINE
7a FIRST CAMERA
7b SECOND CAMERA
91 FIRST DETECTION SURFACE
92 SECOND DETECTION SURFACE

The invention claimed is:

1. A vehicle window glass lifting device, comprising:

a drive mechanism arranged on a vehicle door to vertically move a window glass;

a control unit for controlling the drive mechanism; and a camera for capturing an image of a detection line provided along at least a part of an outer edge of the window glass in a state that the door and the window glass are closed, wherein the detection line comprises at least a first detection line, and a second detection line provided on a vehicle exterior side of the first detection line, wherein the control unit comprises a detection means for detecting a first blocked state in which at least a part of the first detection line captured as the image by the camera is blocked by a foreign object and a second blocked state in which at least a part of the second detection line captured as the image by the camera is blocked by the foreign object, and a crime prevention control means that determines that the foreign object intrudes from a vehicle exterior to a vehicle interior and conducts a crime prevention operation to a crime prevention when a condition that the second blocked state is detected by the detection means without detecting the first blocked state is satisfied.

2. The vehicle window glass lifting device according to claim 1, wherein the crime prevention control means is configured to determine that the foreign object intrudes from the vehicle exterior to the vehicle interior and conducts the crime prevention operation when a condition that the second blocked state is detected by the detection means without detecting the first blocked state and thereafter the first blocked state is detected by the detection means while keeping the second blocked state is satisfied.

3. The vehicle window glass lifting device according to claim 2, wherein the crime prevention operation comprises an operation to lift the window glass automatically.

4. The vehicle window glass lifting device according to claim 2, wherein the camera comprises at least a first camera for capturing the first detection line and a second camera for capturing the second detection line, and wherein the detection means is configured to detect at least the first blocked state based on an image captured by the first camera, and the second blocked state based on an image captured by the second camera.

5. The vehicle window glass lifting device according to claim 2, wherein the control unit comprises a pinching prevention means that causes the drive mechanism to conduct a pinch prevention operation for preventing pinching by the window glass when the first blocked state or the second blocked state is detected while the window glass is moved, and wherein the crime prevention operation comprises an operation to forbid the pinch prevention operation.

6. The vehicle window glass lifting device according to claim 2, wherein the crime prevention operation comprises an operation to lock the door of the vehicle.

7. The vehicle window glass lifting device according to claim 2, comprising a warning means that cautions by at least one of light or sound, wherein the crime prevention operation comprises an operation to caution by the warning means.

8. The vehicle window glass lifting device according to claim 2, comprising an external notification means that communicates with a preset notification object and notifies to the notification object that the foreign object intrudes from the vehicle exterior to the vehicle interior, wherein the crime prevention operation comprises an operation to notify by the external notification means.

9. A vehicle, comprising the vehicle window glass lifting device according to claim 2.

10. The vehicle window glass lifting device according to claim 1 wherein the crime prevention operation comprises an operation to lift the window glass automatically.

11. The vehicle window glass lifting device according to claim 10, comprising a safety control unit causing the drive mechanism to conduct a safety control operation to detect pinching by the window glass and reverse a moving direction of the window glass and lower automatically when pinching occurs, wherein the crime prevention operation comprises an operation to finish the safety control operation after the window glass is automatically lowered by a preset predetermined distance and thereafter the window glass is automatically re-lifted while the second blocked state is kept after the second blocked state is detected by the detection means without detecting the first blocked state.

12. The vehicle window glass lifting device according to claim 1, wherein the camera comprises at least a first camera for capturing the first detection line and a second camera for capturing the second detection line, and wherein the detection means is configured to detect at least the first blocked state based on an image captured by the first camera, and the second blocked state based on an image captured by the second camera.

13. The vehicle window glass lifting device according to claim 1, wherein the control unit comprises a pinching prevention means that causes the drive mechanism to conduct a pinch prevention operation for preventing pinching by the window glass when the first blocked state or the second blocked state is detected while the window glass is moved, and wherein the crime prevention operation comprises an operation to forbid the pinch prevention operation.

14. The vehicle window glass lifting device according to claim 13, wherein the first detection line and the second detection line are provided on a vehicle interior side of the window glass, and wherein the pinching prevention means is configured to cause the drive mechanism to conduct a control to reduce an operational speed of the window glass when the first blocked state is detected while the window glass is moved, and cause the drive mechanism to conduct the pinch prevention operation when the second blocked state is detected.

15. The vehicle window glass lifting device according to claim 1, wherein the crime prevention operation comprises an operation to lock the door of the vehicle.

16. The vehicle window glass lifting device according to claim 1, comprising a warning means that cautions by at least one of light or sound, wherein the crime prevention operation comprises an operation to caution by the warning means.

17. The vehicle window glass lifting device according to claim 1, comprising an external notification means that communicates with a preset notification object and notifies to the notification object that the foreign object intrudes from the vehicle exterior to the vehicle interior, wherein the crime prevention operation comprises an operation to notify by the external notification means.

18. A vehicle, comprising the vehicle window glass lifting device according to claim 1.

* * * * *